US012545846B2

(12) United States Patent
Endres et al.

(10) Patent No.: US 12,545,846 B2
(45) Date of Patent: Feb. 10, 2026

(54) RENEWABLE FUELS, DIESEL AND METHODS OF GENERATION FROM RENEWABLE OIL SOURCES

(71) Applicant: Novita Nutrition, LLC, Brookings, SD (US)

(72) Inventors: Donald L. Endres, Brookings, SD (US); Steven J. Furcich, Monticello, IL (US)

(73) Assignee: Novita Nutrition, LLC, Brookings, SD (US)

( * ) Notice: Subject to any disclaimer, the term of this patent is extended or adjusted under 35 U.S.C. 154(b) by 0 days.

(21) Appl. No.: 18/834,565

(22) PCT Filed: Jan. 31, 2023

(86) PCT No.: PCT/US2023/011996
§ 371 (c)(1),
(2) Date: Jul. 30, 2024

(87) PCT Pub. No.: WO2023/147174
PCT Pub. Date: Aug. 3, 2023

(65) Prior Publication Data
US 2025/0154419 A1    May 15, 2025

Related U.S. Application Data

(60) Provisional application No. 63/267,361, filed on Jan. 31, 2022.

(51) Int. Cl.
*C10L 1/02*        (2006.01)

(52) U.S. Cl.
CPC ......... *C10L 1/02* (2013.01); *C10L 2200/0476* (2013.01); *C10L 2200/0484* (2013.01)

(58) Field of Classification Search
CPC ............... C10L 1/02; C10L 2200/0476; C10L 2200/0484; C11C 3/003; C11C 3/02; C11C 3/06
See application file for complete search history.

(56) References Cited

U.S. PATENT DOCUMENTS

2007/0277429 A1    12/2007  Jackam et al.
2009/0187035 A1*   7/2009  Ko .......................... C11C 3/10
                                                        554/168

(Continued)

OTHER PUBLICATIONS

"Division of Organic Chemistry" American Chemical Society. Aug. 2020.pp. 1-2. (Year: 2020).*

(Continued)

*Primary Examiner* — Latosha Hines
(74) *Attorney, Agent, or Firm* — DeWitt LLP

(57) ABSTRACT

A process for the generation of renewable fuel and/or biofuel from a renewable oil feedstock having a high free fatty acid content. The renewable oil feedstock can be renewable plant oil or renewable animal fat or oil, including renewable corn oil recovered from a by-product of ethanol production, such as distillers corn oil and/or corn oil solvent extracted from distillers dried grains with solubles (DDGS) and/or distillers dried grains (DDG). The free fatty acid content of the renewable oil feedstock can be reduced by a glycerolysis process in the presence of a molar excess of glycerin to provide an adequate resulting feedstock having a reduced free fatty acid content. The resulting feedstock capable of being subjected to further processing for the generation of renewable fuel and/or biofuel.

16 Claims, 4 Drawing Sheets

(56) References Cited

U.S. PATENT DOCUMENTS

| | | |
|---|---|---|
| 2010/0063309 A1 | 3/2010 | Bunning et al. |
| 2010/0092603 A1* | 4/2010 | Bruinsma .............. A23K 10/38 426/601 |
| 2012/0093698 A1 | 4/2012 | Morgan |
| 2012/0123140 A1* | 5/2012 | Jackam .................. C07C 67/03 554/167 |
| 2019/0093048 A1* | 3/2019 | Slade ...................... C10L 1/026 |

OTHER PUBLICATIONS

International Search Report and Written Opinion for PCT/US2023/011996 date mailed Apr. 13, 2023.

* cited by examiner

RENEWABLE FUELS, DIESEL AND METHODS OF GENERATION FROM RENEWABLE OIL SOURCES

CLAIM FOR PRIORITY

This application is a National Phase entry of PCT Application No. PCT/US2023/011996 filed Jan. 31, 2023 which claims the benefit of priority of U.S. Provisional Patent Application No. 63/267,361 filed Jan. 31, 2022, the subject matter of which is incorporated by reference in its entirety.

FIELD OF THE INVENTION

The present invention relates generally to the generation of biofuel and/or renewable fuel from a renewable oil feedstock having a high free fatty acid content, particularly renewable plant oil or renewable animal fat or oil, more particularly renewable corn oil recovered from a by-product of ethanol production as a feedstock, including distillers corn oil and/or corn oil solvent extracted from distillers dried grains with solubles (DDGS) and/or distillers dried grains (DDG). The high free fatty acid content of the renewable oil feedstock can be reduced by glycerolysis in the presence of a molar excess of glycerin to provide a feedstock having a desired free fatty acid content. More particularly, described herein are methods for solvent extraction of crude plant oil from DDGS and/or DDG, which can be subjected to a glycerolysis process and then used as a feedstock for the generation of biofuels and/or renewable fuels, including biodiesel and/or renewable diesel.

BACKGROUND OF THE INVENTION

Ethanol can be produced using grains, such as corn, or other biomass, which are renewable resources. Presently, the majority of ethanol-producing biorefineries in the United States are dry-grind corn biorefineries, and it is estimated that the present ethanol production capacity of such biorefineries runs into the billions of gallons each year. Other alcohols, such as C3-C6 alcohols, can also be produced by the fermentation process of fermentable sugars from grains and other biomass. By-products or co-products of the fermentation process using corn as the feedstock in a corn ethanol biorefining process are distillers corn oil (DCO), distillers dried grains (DDG) and distillers dried grains with solubles (DDGS). Based on recent production rates of ethanol from dry-grind ethanol plants, approximately 44 million metric tons of DDGS are produced in the United States annually. The fermentation process to produce other C3-C6 alcohols from fermentable sugars from biomass also produces similar distillers oil.

Biodiesel is generally not considered to be a full replacement of conventional petrodiesel for use in most diesel engines. Rather, biodiesel is generally blended with petrodiesel a ratio of about 5-20% for use in the retail diesel fuel marketplace. Renewable diesel, on the other hand, may be produced by hydrotreatment of DCO, for example, resulting in a hydrocarbon fuel that is very similar to petroleum diesel in its chemical composition.

A number of reaction schemes exist for conversion of DCO into renewable diesel. The most prominent reaction scheme is hydrotreating a DCO feedstock with hydrogen under elevated temperature and pressure to change the chemical composition of the DCO feedstock. In the case of renewable diesel, hydrogen is introduced to the DCO feedstock in the presence of a catalyst to convert triglyceride molecules into paraffinic hydrocarbons. In addition to creating a fuel that is very similar to petrodiesel, this process creates other hydrocarbon by-products including lower hydrocarbon fuel gas compounds (e.g., methane, ethane, propane, and butane) and higher hydrocarbon naphtha. U.S. Pat. No. 8,563,792 discloses an exemplary renewable diesel system by treating a biofeedstock in a reactor that includes a hydrotreatment catalyst (e.g., molybdenum attached to a alumina support structure) in the presence of hydrogen at temperatures between 500-540° F.

U.S. Patent Publication 2015/0041305 discloses an exemplary renewable diesel system by hydrogenation of corn oil from an ethanol plant at relatively high temperatures in the presence of a deoxygenating catalyst and an isomerization catalyst. U.S. Pat. No. 11,136,508, which is incorporated by reference in its entirety, discloses a method of producing renewable fuel from crude corn oil produced from at least one by-product of a dry-grind ethanol process, such as DDGS and/or DDG.

A 2018 Graduate Theses and Dissertation from Iowa State University titled "FFA Generation During Dry-Grind Corn Ethanol Fermentation" summarized the reported percentage of free fatty acids (FFAs) in oil from a dry-grind ethanol to be at least 4% and up to 12% in DCO and greater than 7% and up to 15% in oil from DDGS.

One problem with the current hydrotreatment of feedstocks from renewable sources to produce renewable fuels is that FFAs can act as a poison to catalysts, thereby reducing their life, which takes time, money and potential shutdowns to change out catalysts. And feedstocks from renewable sources typically have a high free fatty acid (FFA) content that can prematurely shorten the lifetime of a catalyst during the hydrotreatment process. Another problem associated with FFAs during renewable fuel production relates to the FFAs adversely impacting the metallurgy of processing equipment as FFAs are corrosive, particularly more so at higher pressure and temperature conditions during processing. A high FFA content can also be a major processing concern in biodiesel production.

Therefore, there exists a need in the industry for the production of renewable fuels, including renewable diesel that can be a substitute for petrodiesel. There also exists a need in the industry for an efficient and cost-effective process for the generation of renewable fuels, including renewable diesel, from a feedstock, preferably a feedstock that is a co-product or byproduct, more preferably a feedstock from one or more renewable sources. There also exists a need in the industry for an efficient and cost-effective process for the generation of renewable fuels, including renewable diesel, from a feedstock, preferably a feedstock that is a co-product or byproduct of producing one or more C2-C6 organic alcohols via a fermentation of renewable biomass process, more preferably a feedstock from one or more renewable sources that does not prematurely foul catalysts utilized during the hydrotreatment process. There further is a need in the industry for feedstocks having a low FFA content or conversion of a high FFA content feedstock to a low FFA content feedstock, such that the FFAs do not pose problems during biodiesel or renewable diesel production.

Figure 1:
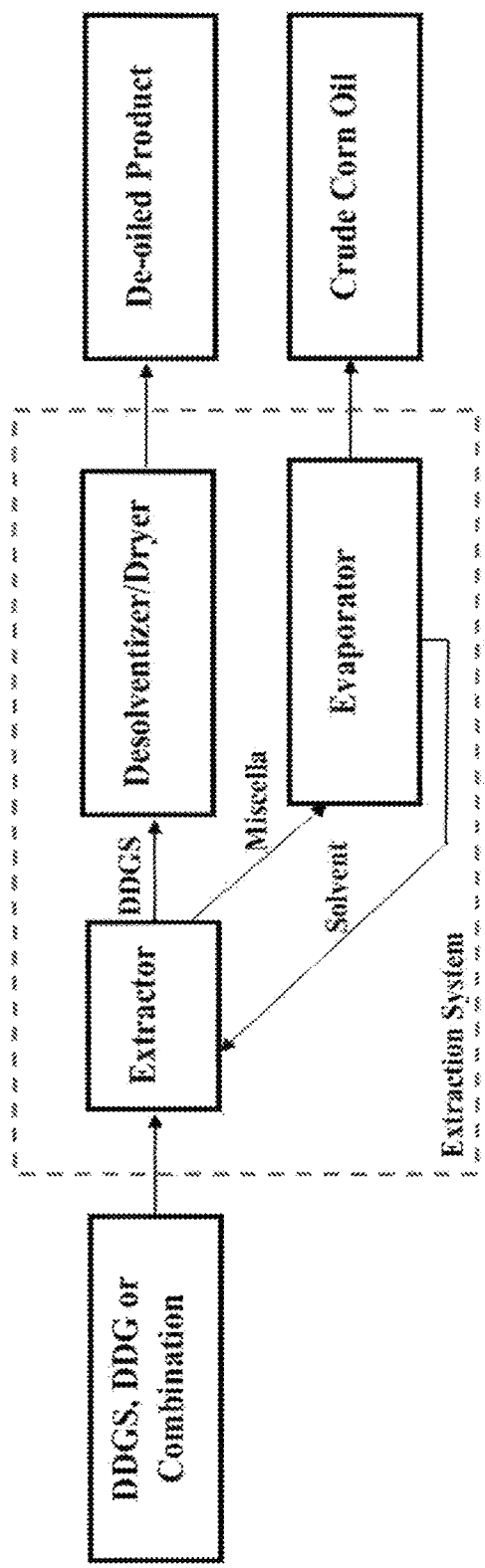
FIG. 1 provides a flow-chart schematic representation of a process by which crude corn oil is solvent extracted from DDGS, DDG or a combination thereof, which also produces a de-oiled product, according to certain aspects of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

SUMMARY

The present disclosure relates to the generation of one or more renewable fuel and/or one or more biofuel from a renewable oil feedstock. The renewable oil feedstock can be renewable plant oil and/or renewable animal fat or oil, including renewable corn oil recovered as a by-product or co-product of alcohol production, such as distillers corn oil (DCO), corn stillage oil (CSO) and/or corn oil solvent extracted from distillers dried grains with solubles (DDGS) and/or distillers dried grains (DDG). In some preferred aspects, a free fatty acid content of the renewable oil feedstock can be converted by a glycerolysis process. In some preferred aspects, the glycerolysis process converts a portion of triglycerides in the renewable oil feedstock having a high level of free fatty acids to monoglycerides and/or diglycerides, such that the converted feedstock has a lowered level of free fatty acids. The glycerolysis process is preferably conducted in the presence of a molar excess of glycerin. The resulting feedstock is capable of being subjected to a conversion process to produce one or more renewable fuels or one or more biofuels.

In some preferred aspects, the glycerolysis process can be performed as a thermodynamic glycerolysis or an enzymatic glycerolysis to convert at least a portion of the free fatty acid content to monoacylglycerols and/or diacylglycerols, preferably a monoglyceride and diglyceride mixture.

In some aspects, the present invention is directed at a method of producing one or more renewable fuels or one or more biofuels from a renewable oil source, the method comprising providing a renewable oil source: conducting glycerolysis on the free fatty acid content of the renewable oil source in the presence of a source of glycerin to provide a feedstock having a reduced free fatty acid content; and subjecting the feedstock to a conversion process to produce one or more renewable fuel or one or more biofuels.

In some aspects, the present invention is directed at a system for producing a feedstock from a renewable oil source, the feedstock capable of being used in a renewable fuel process for producing one or more renewable fuels or a biofuel process for producing one or more biofuels, the system comprising a renewable oil source; a source of glycerin; and a reactor vessel for combining the renewable oil source and the glycerin source into a reaction mixture, the reactor vessel including a means for conducting a glycerolysis reaction to convert the reaction mixture into the feedstock; wherein the feedstock having a reduced free fatty acid content; and wherein the feedstock is capable of being subjected to a conversion process to produce one or more renewable fuels or one or more biofuels.

In some aspects, the present invention is directed at a grain-based ethanol biorefinery at a single facility configured to produce a feedstock from a renewable oil source, the feedstock capable of being used in a renewable fuel process for producing one or more renewable fuels or a biofuel process for producing one or more biofuels, the facility comprising a dry-grind ethanol facility configured to process grain and produce distillers dried grains with solubles and/or distiller's dried grains; a solvent extraction facility configured to extract a renewable oil source from the distillers dried grains with solubles and/or distiller's dried grains; and a glycerolysis reactor configured to conduct a glycerolysis reaction on the renewable oil source in the presence of a glycerin source to convert the reaction mixture into a feedstock; wherein the feedstock is capable of being subjected to a conversion process to produce one or more renewable fuels or one or more biofuels.

In some aspects, the present invention is directed at a renewable fuel or a biofuel produced from a renewable oil source, wherein the renewable oil source has undergone a glycerolysis reaction in the presence of glycerin to provide a feedstock, and wherein the feedstock subjected to a conversion process to produce the renewable fuel or the biofuel.

In some aspects, the present invention is directed at a feedstock produced from a renewable oil source, wherein the renewable oil source has undergone a glycerolysis reaction in the presence of glycerin to provide the feedstock, and wherein the feedstock is capable of being subjected to a conversion process to produce one or more renewable fuels or one or more biofuels.

In some preferred aspects, the renewable oil source is a plant-based oil, preferably a plant-based oil chosen from the group consisting of corn oil, soy bean oil, palm oil, peanut oil, rice oil, flaxseed oil, sesame oil, grape seed oil, sunflower oil, rapeseed oil, olive oil, canola oil, coconut oil, almond oil, avocado seed oil, cottonseed oil, hemp oil, pumpkin seed oil, safflower seed oil, castor oil and nut oil.

In some preferred aspects, the renewable oil source is provided from solvent extraction of distillers dried grains with solubles (DDGS), distillers dried grains (DDG), or a combination thereof, preferably corn DDGS, corn DDG, or a combination thereof.

In some preferred aspects, the solvent extraction uses at least one non-polar solvent comprising one or more C5-C7 alkanes. The one or more C5-C7 alkanes preferably being one or more isomers, enantiomers or mixtures of C5-C7-alkanes. The one or more isomers, enantiomers or mixtures of C5-C7-alkanes preferably including one or more of n-pentane, n-hexane and n-heptane, as well as the structural isomers thereof (i.e., isopentane, neopentane, isohexane, 2-methylepentane, 2,3-dimethylbutane, neohexane, isoheptane, 2-methylhexane, 2,2-dimethylpentane, 2,3-dimethylpentane, 2,4-dimethylpentane, 3-ethylpentane, and 2,2,3-trimethylbutane) and petroleum ether.

In some preferred aspects, the solvent extraction uses at least one at least one renewable solvent. In some preferred aspects, the at least one renewable solvent comprises 2-methyloxolane.

In some preferred aspects, solvent extraction uses at least one solvent having a boiling point in the range of about 36° C. to about 99° C.

In some preferred aspects, the renewable oil source is a renewable corn oil source provided from solvent extraction of distillers dried grains with solubles (DDGS), distillers dried grains (DDG), or a combination thereof, wherein the solvent extraction using at least one non-polar solvent comprising one or more C5-C7-alkanes, preferably one or more isomers, enantiomers or mixtures of C5-C7-alkanes, preferably the one or more isomers, enantiomers or mixtures of C5-C7-alkanes including one or more of n-pentane, n-hexane and n-heptane, as well as the structural isomers thereof (i.e.,isopentane, neopentane, isohexane, 2-methylepentane, 2,3-dimethylbutane, neohexane, isoheptane, 2-methylhexane, 2,2-dimethylpentane, 2,3-dimethylpentane, 2,4-dimethylpentane, 3-ethylpentane, and 2,2,3-trimethylbutane) and petroleum ether.

In some preferred aspects, the renewable oil source is a renewable corn oil source provided from solvent extraction of distillers dried grains with solubles (DDGS), distillers dried grains (DDG), or a combination thereof, wherein the solvent extraction using at least one one renewable solvent comprising 2-methyloxolane.

In some preferred aspects, the renewable oil source is a renewable corn oil source provided from solvent extraction of distillers dried grains with solubles (DDGS), distillers dried grains (DDG), or a combination thereof, wherein the solvent extraction using at least one solvent having a boiling point in the range of about 36° C. to about 99° C.

In some preferred aspects, the renewable oil source comprises an animal-based oil. Preferably, the animal-based oil extracted from rendered tissue fats from livestock animals chosen from pigs, cows and chickens. The animal-based oil preferably chosen from white grease, tallow, suet, lard, schmaltz, and poultry oil.

In some preferred aspects, the glycerolysis process is a batch process or a continuous process. The glycerolysis process is preferably conducted in the presence of a molar excess of glycerin. In some preferred aspects, the glycerolysis reaction does not convert the entire free fatty acid content of the renewable oil source, such that the glycerolysis process is not conducted to completion. Instead, in some preferred aspects, the glycerolysis process reduces a portion of the free fatty acid content of the renewable oil source to the feedstock having a desirable reduced free fatty acid content for further conversion to one or more renewable fuels and/or one or more biofuels.

In some preferred aspects, the glycerolysis process is a thermodynamic reaction conducted at a reaction temperature between about 150° C. and about 250° C., and in some preferable aspects between about 175° C. and about 225° C.

In some preferred aspects, the glycerolysis process is conducted for a period of time between about 30 minutes and about 180 minutes, and in some preferred aspects between about 60 minutes and about 120 minutes.

In some preferred aspects, the glycerolysis process has a glycerin to free fatty acid molar ratio of at least 1.1:1, in some preferred aspects at least 1.25:1, in some aspects at least 1.5:1.

In some preferred aspects, the glycerolysis process is an enzymatic reaction.

In some preferred aspects, the renewable oil source having a free fatty acid content comprising a triacylglycerides portion in an amount between about 75% and about 95%, a diacylglycerides portion in an amount between about 5% and about 12%, and a monoacylglycerides portion less than about 5%, wherein a total content of the diacylglycerides portion and the monaclyglycerides portion is less than 15%, by mass of total fat.

In some preferred aspects, the feedstock provided by the glycerolysis process having a reduced free fatty acid content comprising a reduced triacylglycerides portion, wherein at least 80% of the free fatty acid content of the renewable oil source is converted by glycerolysis to at least 15% monoglycerides, diglycerides, or a combination thereof, by mass of total fat.

In some preferred aspects, the free fatty acid content of the renewable oil source is greater than 5%, in some aspects greater than about 6%, in some aspects greater than about 7%, in some aspects greater than about 8%, in some aspects greater than about 9%, in some aspects greater than about 10%, in some aspects greater than about 11%, in some aspects greater than about 12%, in some aspects greater than about 13%, in some aspects greater than about 14%, and in some other aspects up to about 15%, by mass of total fat.

In some preferred aspects, the free fatty acid content of the feedstock has been reduced to a content less than 4%, in some aspects less than 3%, in some aspects less than 2%, and in some aspects less than 1%, by the glycerolysis process.

In some preferred aspects, the free fatty acid content in the renewable oil source feedstock prior to the glycerolysis reaction is greater than 1%, in some aspects greater than about 2%, in some aspects greater than about 3%, in some aspects greater than about 4%, in some aspects greater than about 5%, in some aspects greater than about 6%, in some aspects greater than about 7%, in some aspects greater than about 8%, in some aspects greater than about 9%, in some aspects greater than about 10%, in some aspects greater than about 11%, in some aspects greater than about 12%, in some aspects greater than about 13%, in some aspects greater than about 14%, and in some other aspects up to about 15%, by mass of total fat. In some preferred aspects, the free fatty acids content in the renewable oil source feedstock prior to the glycerolysis reaction is between about 5% and about 15%, by mass of total fat.

In some preferred aspects, the free fatty acid content of the renewable oil source is reduced by the glycerolysis process in an amount of at least 1%, in some aspects in an amount of at least 2%, in some aspects in an amount of at least 3%, in some aspects in an amount of at least 4%, in some aspects in an amount of at least 5%, in some aspects in an amount of at least 6%, in some aspects in an amount of at least 7%, in some aspects in an amount of at least 8%, in some aspects in an amount of at least 9%, in some aspects in an amount of at least 10%, in some aspects in an amount of at least 11%, in some aspects in an amount of at least 12%, in some aspects in an amount of at least 13%, and in some aspects in an amount of at least 14%, by mass of total fat, as compared to a starting feedstock of the renewable oil source.

In some preferred aspects, the free fatty acids content of the renewable oil source is reduced by the glycerolysis process in an amount between about 1% and about 14%, and in some aspects between about 2% and about 10%, by mass of total fat.

In some preferred aspects, the reduced free fatty acids content of the feedstock is less than 4%, in some aspects less than 3%, in some aspects less than 2%, and in some aspects less than 1%, in some less than about 0.9%, in some aspects less than about 0.8%, in some aspects less than about 0.7%, in some aspects less than about 0.6%, and in some aspects less than about 0.5%, by mass of total fat.

In some preferred aspects, the reduced free fatty acids content of the feedstock is between about 0.1% and less than 4%, in some aspects between about 0.25% and less than 3%, and in some other aspects between about 0.5% and less than 2% by mass of total fat.

In some preferred aspects, the glycerolysis process converts up to 80%, in some aspects up to 85%, in some aspects up to 90%, in some aspects up to 95%, in some aspects up to 98%, and in some other aspects up to 99%, of free fatty acids content of the feedstock to monoglycerides, diglycerides, or a combination thereof.

In some preferred aspects, the renewable oil source undergoes the glycerolysis process in the presence of a molar excess of glycerin to the free fatty acids in the renewable oil source of at least 1.1:1, in some aspects at least 1.25:1, and in some aspects at least 1.5:1.

In some preferred aspects, a pre-treatment step is conducted on the renewable oil source prior to conducting the glycerolysis process. In some other preferred aspects, a pre-treatment step is conducted on the converted feedstock after glycerolysis but prior to a biofuel process or a renewable fuel process. In some other preferred aspects, a pre-treatment step is conducted on the renewable oil source prior to conducting glycerolysis and on the resultant feedstock after conducting glycerolysis. In some preferred aspects, the pre-treatment step reduces a metal or ion content.

In some preferred aspects, one or more enzymes is added to a miscella portion of the solvent extraction process, wherein the one or more enzymes reduces the free fatty acid content of the resulting renewable oil in comparison to the renewable oil generated without the addition of the one or more enzymes added to the miscella portion. Preferably, the one or more enzymes are provided as a liquid phase enzyme or on a fixed bed configuration.

In some preferred aspects, the one or more biofuels ultimately generated from the renewable oil source comprises biodiesel.

In some preferred aspects, the one or more renewable fuels ultimately generated from the renewable oil source is chosen from the group consisting of renewable hydrogen, renewable propane, renewable naphtha, renewable jet fuel and renewable diesel.

In some preferred aspects, the one or more renewable fuels comprises sustainable aviation fuel, preferably meeting ASTM D7566 standards.

In some preferred aspects, the one or more renewable fuel comprises renewable diesel, preferably renewable diesel meeting ASTM D975 specification for petroleum diesel in the United States or EN 590 in Europe.

The above summary of the various representative embodiments and preferred aspects of the invention is not intended to describe each illustrated embodiment or every implementation of the present invention. Rather, the foregoing embodiments and aspects are chosen and described so that others skilled in the art can appreciate and understand the principles and practices of the present invention. The figures and the detailed description that follow more particularly exemplify various embodiments and preferred aspects of the present invention.

DETAILED DESCRIPTION

The terms "distillers oil" or "DO" referred to herein shall mean a co-product of a bio-fermentation process using biomass for fermentation that is extracted from the thin stillage.

The terms "distillers corn oil" or "DCO" referred to herein shall mean a coproduct of dry-milled corn C2-C6 alcohol production that is extracted from the thin stillage.

The terms "distiller's dried grains with solubles" or "DDGS" referred to herein shall mean a co-product of alcohol production having the AAFCO definition, which is the product obtained after the removal of ethyl alcohol by distillation from the yeast fermentation of corn, grain or a grain mixture by condensing and drying at least three-quarters of the solids of the resultant whole stillage by methods employed in the grain distilling industry, wherein the predominating grain can precede the terms (e.g., corn DDGS, barley DDGS, wheat DDGS, etc.).

The terms "dried distiller's grains" or "distiller's dried grains" or "DDG" referred to herein shall mean a co-product of dry-milled ethanol production having the AAFCO definition, which is the product obtained after the removal of ethyl alcohol by distillation from the yeast fermentation of corn, grain or a grain mixture by separating the resulting coarse grain fraction of the whole stillage and drying it by methods employed in the grain distilling industry, wherein the predominating grain can precede the terms (e.g., corn DDG, barley DDG, wheat DDG, etc.).

The term "distillers meal" referred to herein shall mean the product or co-product resulting from solvent extraction of DDGS, DDG or a combination thereof, that has been dried of excess water, including the instance of the resultant product or co-product retaining substantially all the crude protein and fiber content of the respective DDGS, DDG or a combination thereof, prior to solvent extraction, and also including the instance of the resultant product or co-product having a portion of the fiber and/or soluble fractions reduced by any further processes such that the resultant product or co-product has a higher protein content compared to the DDGS, DDG or a combination thereof prior to solvent extraction.

The terms "high free fatty acid level" or "high free fatty acid content" referred to herein shall mean a free fatty acid content greater than 1.0%, in some aspects about 2% to about 15%, by mass of total oil or fat as measured by ASTM D5555-95 (2017) in a renewable oil source or a renewable oil feedstock, including a renewable plant-based oil, a renewable animal-based fat or oil, distillers corn oil from a dry-grind ethanol process, oil extracted from DDGS and/or DDG, corn oil extracted from DDGS and/or DDG from a dry-grind ethanol process, oil solvent extracted from DDGS and/or DDG from a dry-grind ethanol process, and/or corn oil solvent extracted from DDGS and/or DDG from a dry-grind ethanol process.

The term "low free fatty acid level" or "low free fatty acid content" referred to herein shall mean a free fatty acid content of 1.0% or less, in some aspects between about 0.25% to less than 1.0%, by mass of total oil or fat as measured by ASTM D5555-95 (2017) in a renewable oil source or a renewable oil feedstock, including a renewable plant-based oil, a renewable animal-based fat or oil, distillers corn oil from a dry-grind ethanol process, oil extracted from DDGS and/or DDG, corn oil extracted from DDGS and/or DDG from a dry-grind ethanol process, oil solvent extracted from DDGS and/or DDG from a dry-grind ethanol process, and/or corn oil solvent extracted from DDGS and/or DDG from a dry-grind ethanol process.

It will be readily understood that the methods and materials as they are generally described and illustrated in the figures herein could be arranged and designed in a wide variety of different configurations. Thus, the following more detailed description of various embodiments of the methods and materials provided herein is not intended to limit the scope of the claims, but merely provides representative examples of various embodiments of the subject matter recited in the appended claims.

For example, though DDGS are referenced herein with respect to the methods and materials described, it is to be understood that DDG could also be utilized instead of or in addition to the DDGS. In particular, DDG retain significant oil content, and in embodiments of the processes and methods described herein DDG may be used in place of DDGS or in combination with DDGS. Also, while every ethanol plant is configured differently, each ethanol plants handles recycle streams differently, including recycling different process streams of solubles to the distilled dried grains. Additionally, ethanol plants may also contain a commercial production of other biobased alcohols, such as isobutanol, alongside ethanol. Still further, biobased alcohol production can relate any of the C2-C6 organic alcohol productions. Thus, the following description specific to DDGS should also be understood to be applicable to DDG or a combination of DDGS and DDG as it relates to the various grain and/or biomass feedstocks. Thus, the following description specific to DDGS should also be understood to be applicable to DDG or a combination of DDGS and DDG.

As is described herein, the commercial value of one or more feedstocks of renewable oils can be enhanced by converting the renewable oils into one or more desirable feedstocks for renewable fuel or biofuel production. However, some renewable oil feedstocks whether plant or animal based have a high FFA content, which is usually undesirable as it can cause various problems. For instance, corn oil extracted from DDGS typically has a FFA content of at least about 7% up to about 12% and potentially higher. Similarly, DCO typically has a FFA content of at least about 4% up to about 12% and potentially higher. Without wishing to be bound by theory, it is believed that FFA generation in a dry-grind fermentation of corn to ethanol is incremental and cumulative due to various parameters and conditions during the ethanol processing. Accordingly, FFA generation in a dry-grind fermentation of other biomass to ethanol or other C3-C6 organic alcohol is also expected to be incremental and cumulative due to the same reasons.

In some aspects, the renewable oil feedstock is derived from standard #2 yellow dent corn typically having 3-5% oil, which represents about 99% of corn grown in the U.S. and currently used for animal feed and industrial uses. In some aspects, the renewable oil feedstock is derived from at least 50%, in some aspects at least 55%, in some aspects at least 60%, in some aspects at least 65%, in some aspects at least 70%, in some aspects at least 75%, in some aspects at least 80%, in some aspects at least 85%, in some aspects at least 90%, in some aspects at least 95%, in some aspects at least 99%, and in some aspects 100%, standard #2 yellow dent corn.

In some other aspects, the renewable oil feedstock is derived from high-oil content corn, which is genetically altered to have more than 5% oil, in some aspects at least 6% oil, in some aspects up to 9% oil or more, and in some aspects between 6% and 9% oil. The oil extracted from high-oil content corn, including DCO and oil mechanically or solvent extracted from DDGS, DDG or a combination thereof, has signature protein traits that are not available in standard #2 yellow dent corn, such that the resultant oil from high-oil content corn can be determined.

Other feedstocks of renewable oil may have a FFA content that is higher than desired, including other plant-based oils or animal-based oils. Plant-based oils may include soy bean oil, palm oil, peanut oil, rice oil, flaxseed oil, sesame oil, grape seed oil, sunflower oil, rapeseed oil, olive oil, canola oil, coconut oil, almond oil, avocado seed oil, cottonseed oil, hemp oil, pumpkin seed oil, safflower seed oil, castor oil, nut oil and the like. Animal-based fats/oils are primarily extracted from rendered tissue fats from livestock animals, such as pigs, cows and chickens. Accordingly, animal-based fats/oils may include choice white grease, tallow; suet, lard, schmaltz, poultry oil and the like.

According to certain aspects of the present disclosure, the FFA content of one or more feedstocks is reduced to a desirable level prior to being utilized in a renewable fuel process, renewable diesel process, biofuel process and/or biodiesel process.

In some preferred aspects, the feedstock is extracted from a byproduct of a dry-grind fermentation process to produce alcohol, including C2-C6 organic alcohols, such as ethanol, isopropanol, n-propanol, isobutanol, n-butanol, isopentanol, n-pentanol, isohexanol and n-hexanol and the like, produced from the starch or sugars of plants, including grains and biomass, such as corn. For instance, commercially valuable amounts of corn oil can be extracted from the DDG and/or DDGS, such as by a solvent extraction process. The corn oil extracted from DDG and DDGS can then be subjected to a transesterification process, sometimes in conjunction with an esterification process, to yield biodiesel and glycerin. Alternatively, the oil extracted from DDG and DDGS can be subjected to a hydro-treating process to yield a renewable green diesel fuel.

In some preferred aspects, one or more feedstocks of renewable oil can be subjected to other oleochemical processing, such as fat splitting (or hydrolysis) of the glycerides (e.g., triglyceride, diglyceride and monoglyceride) into different oleochemical fractions to produce crude fatty acids and glycerin. After the splitting process, the crude fatty acids may be subjected to additional processing, such as distillation, fractionation, and other methods of separation to produce crude, distilled and fractionated fatty acids. Similarly, the crude glycerin may be subjected to additional processing, such as adsorptive filtration using adsorptive materials, such as activated carbon, and distillation to produce refined glycerine. The fatty acids and/or glycerine may be subjected to further chemical and enzymatic reactions to yield desired oleochemicals to be utilized in renewable green diesel fuel production and/or biodiesel production.

In some aspects, the crude fatty acids are subjected to fractionation processing to yield C12, C14, C16 and/or C18 fractionated fatty acids.

The distillers meal resulting from solvent extraction as described herein is still suitable for use as an animal feed ingredient, such as, for example, a feed supplement or constituent for domestic pets, livestock (such as beef cattle, dairy cattle, equine, sheep and/or swine), aquaculture or poultry, including chickens, geese and/or turkey. Therefore, solvent extraction of DDG and DDGS according to the methods described herein may facilitate a reduction in the effective costs of producing ethanol from a grain-based biorefinery, as it allows for production of multiple, commercially-valuable products from DDG and DDGS.

In one embodiment, ethanol production, solvent extraction of DDGS, and refining of the crude oil removed from the DDGS can occur in a single facility. For example, in such an embodiment, a grain-based ethanol biorefinery may further include facilities for solvent extraction of the DDGS produced at the biorefinery. In another such embodiment, a grain-based ethanol biorefinery may further include facilities for solvent extraction of the DDGS produced at the biorefinery and facilities for processing the crude oil extracted from the DDGS to produce glycerin, biodiesel and renewable diesel. In yet another embodiment, a grain-based ethanol biorefinery may further include facilities for solvent extraction of the DDGS produced at the biorefinery and facilities for processing and refining the crude oil extracted from the DDGS to produce renewable biodiesel and/or renewable diesel. In yet another embodiment, a grain-based ethanol biorefinery may further include facilities for solvent extraction of the DDGS produced at the biorefinery and facilities for processing and refining the crude oil extracted from the DDGS to provide a desirable feedstock by a glycerolysis reaction in order to produce biodiesel and/or renewable diesel. By integrating these operations within a single facility, process efficiencies may be gained and costs of solvent extracting the DDGS and processing or refining the extracted oil may be reduced.

In another embodiment, a biorefinery or facility may process a renewable oil source having higher than desired levels of free fatty acids by performing either thermodynamic or enzymatic glycerolysis of the renewable oil source having higher than desired levels of free fatty acids in the presence of glycerin to provide a feedstock having a lowered free fatty acid level compared to the renewable oil source. In some preferred aspects, the renewable oil source has free fatty acids and/or triglycerides converted to monoglycerides and/or diglycerides in the glycerolysis process. In some preferred aspects, the glycerolysis process is conducted under a molar excess of glycerin to the fatty acids in the renewable oil source. In some preferred aspects, the glycerolysis process provides a result feedstock mixture of renewable oil having a resultant composition containing at least 15% monoglycerides, diglycerides, or a combination thereof.

In some aspects, the free fatty acid content of the renewable oil source contains between about 75% and about 95% triacylglycerides, between about 5% and about 12% diacylglycerides and less than about 5%, in some aspects less than about 4%, in some aspects less than about 3%, and in some aspects less than about 2% monoacylglycerides, such that the total content of the diacylglycerides and monacylglycerides in the renewable oil source is less than 15%.

In some aspects, at least 80% and up to 99% of the free fatty acid content is converted to a mixture of monoglycerides and diglycerides by the glycerolysis process.

In some preferred aspects, the renewable oil source is crude oil from DDGS and/or DDG. In some preferred aspects, the crude oil from DDGS and/or DDG is solvent extracted.

Solvent Extraction of Crude Oil from DDGS and/or DDG

Using solvent extraction processes, commercially significant amounts of crude plant oils can be isolated from DDGS, while maintaining the value of DDGS as a feed supplement. In one embodiment, the DDGS used in a solvent extraction process as described herein are selected from DDGS generated in alcohol production processes that utilize corn, barley, rye, sorghum, or soybean grain, such as ethanol, isobutanol or other C2-C6 organic alcohol productions. In another embodiment, the DDGS used in a solvent extraction process are corn DDGS generated from a dry-grind corn alcohol biorefinery, in some aspects preferably an ethanol biorefinery.

Solvent extraction processes suitable for extraction of crude oil from DDGS include processes that utilize ethanol, hexane, iso-hexane, petroleum distillate, mixtures thereof, or one or more other suitable solvents, as known in the art, for oil extraction of DDGS. In one preferred aspect, solvent extraction processes suitable for extraction of crude oil from DDGS include processes that utilize one or more renewable solvents. In some preferred aspects, the one or more renewable solvents comprises 2-methyloxolane. One of ordinary skill in the art will appreciate that such solvents may be commercial grade or reagent grade solvents. In some aspects, solvent extraction processes suitable for extraction of crude oil from DDGS or crude corn oil form corn DDGS include processes that utilize suitable non-polar solvents that have a high solvent power for lipids, are commercially available, are acceptable regulatory-recognized solvents and/or can be readily removed from the resulting product by commonly accepted methods such as distillation, washing and/or evaporation.

In some aspects, suitable non-polar solvents comprise saturated hydrocarbons, such as one or more C5-C7-alkanes, including one or more isomers, one or more enantiomers, and mixtures thereof. In some aspects, the isomers, enantiomers and mixtures of C5-C7-alkanes includes one or more of n-pentane, n-hexane and n-heptane, as well as the structural isomers thereof (i.e.,isopentane, neopentane, isohexane, 2-methylepentane, 2,3-dimethylbutane, neohexane, isoheptane, 2-methylhexane, 2,2-dimethylpentane, 2,3-dimethylpentane, 2,4-dimethylpentane, 3-ethylpentane, and 2,2,3-trimethylbutane) and petroleum ether. In some aspects, suitable solvents are renewable solvents, such as 2-methyloxolane alone or in combination with one or more suitable non-polar solvents.

In some aspects, suitable non-polar solvents or mixtures thereof have a boiling point in the range from about 36° C. to about 99° C. In some aspects, the non-polar solvents may be purified or commercial grade. For example, in some aspects, a suitable non-polar solvent includes commercial grade hexane, which one of ordinary skill in the art will appreciate comprises a mixture of n-hexane, other isomers of hexane and small amounts of other miscellaneous hydrocarbons (i.e., acetone, methyl ethyl ketone, dichloromethane, and trichloroethylene, aromatics such as toluene and/or other types of petroleum hydrocarbons).

In some aspects, suitable solvents comprise mixtures of solvents containing alkanes or blends of polar and non-polar solvents that form azeotropes. For example, suitable blends of polar and non-polar solvents may include hexane:ethanol or hexane:isopropanol. Such solvents may also include ketones such as acetone. In some aspects, the azeotrope comprises a blend of polar and non-polar solvents, such that the blend is a positive azeotrope, which has a boiling point at a lower temperature than any other ratio of its constituents.

In some other preferred aspects, suitable solvents comprise mixtures of solvents containing alkanes or blends of renewable solvents and non-polar solvents, polar solvents, or a mixture thereof. For example, suitable blends of renewable and non-polar solvents may include 2-methyloxolane: hexane, suitable blends of renewable and polar solvents may include 2-methyloxolane:ethanol or 2-methyloxolane:isopropanol, and suitable blends of renewable, non-polar and polar solvents may include 2-methyloxolane:hexane:ethanol or 2-methyloxolane:hexane:isopropanol. Such solvents may also include ketones such as acetone. In some aspects, the suitable blends forms an azeotrope, which comprises a blend of polar and non-polar solvents, such that the blend is a positive azeotrope, which has a boiling point at a lower temperature than any other ratio of its constituents.

In one embodiment, the solvent extraction process utilizes a solvent, such as, for example, hexane and/or 2-methyloxolane that serves to remove oil from the DDGS without substantially altering the protein or fiber content of the DDGS. Oil extraction of the DDGS as described herein yields a distillers meal. In one embodiment, the solvent extraction process removes about 60% or more, about 65% or more, about 70% or more, about 75% or more, about 80% or more, or about 90% or more of the oil present in the DDGS.

In another embodiment, the solvent extraction process is a hexane extraction process that removes about 60% or more, about 65% or more, about 70% or more, about 75% or more, about 80% or more, or about 90% or more of the oil present in the DDGS. In yet another embodiment, the solvent extraction process is a hexane extraction process that removes about 75% or more, about 80% or more, or about 90% or more of the oil present in corn DDGS.

In another embodiment, the solvent extraction process is a 2-methyloxolane extraction process that removes about 60% or more, about 65% or more, about 70% or more, about 75% or more, about 80% or more, or about 90% or more of the oil present in the DDGS. In yet another embodiment, the solvent extraction process is a 2-methyloxolane extraction process that removes about 75% or more, about 80% or more, or about 90% or more of the oil present in corn DDGS.

In yet another embodiment, the solvent extraction process is an extraction process using a mixture of non-polar solvents having a boiling point range between about 36° C. to about 99° C. that removes about 60% or more, about 65% or more, about 70% or more, about 75% or more, about 80% or more, or about 90% or more of the oil present in DDGS, and in some aspects corn DDGS.

In yet another embodiment, the solvent extraction process is an extraction process using an azeotrope of a polar solvent and an alkane solvent that removes about 75% or more, about 80% or more, or about 90% or more of the oil present in DDGS, and in some aspects corn DDGS.

In yet another embodiment, the solvent extraction process is a hexane extraction process that removes about 60% or more, about 65% or more, about 70% or more, about 75% or more, about 80% or more, or about 90% or more of the oil present in DDGS produced at a dry-grind corn ethanol biorefinery. Corn DDGS typically include about 5% up to about 15% by weight oil content, and in one embodiment, the solvent extraction process is a hexane extraction process that results in a corn distillers meal having a residual oil content of approximately 0.25-5% by weight, in some other aspects approximately 0.5-4% by weight, in some other aspects approximately 2-3% by weight, and in still some other aspects approximately 0.25-3% by weight. In another embodiment, corn DDGS are subjected to a hexane extraction process that results in a corn distillers meal having a residual oil content of no more than 3.0% by weight, in some aspects no more than 2.5% by weight.

In another embodiment, the solvent extraction process is a 2-methyloxolane extraction process that results in a corn distillers meal having a residual oil content of approximately 0.25-5% by weight, in some other aspects approximately 0.5-4% by weight, in some other aspects approximately 2-3% by weight, and in still some other aspects approximately 0.25-3% by weight. In another embodiment, corn DDGS are subjected to a 2-methyloxolane extraction process that results in a corn distillers meal having a residual oil content of no more than 3.0% by weight, in some aspects no more than 2.5% by weight.

In yet another embodiment, the solvent extraction process utilizes a solvent extraction process that results in a corn distillers meal having a residual oil content of approximately 2-3% by weight, in some other aspects approximately 0.25-5% by weight, in some other aspects approximately 1-4% by weight, and in still some other aspects approximately 0.25-3% by weight. In another embodiment, corn DDGS are subjected to a solvent extraction process that results in a corn distillers meal having a residual oil content of no more than 3.0% by weight, in some aspects no more than 2.5% by weight.

Where the DDGS are produced at a dry-grind corn ethanol biorefinery, a flow-chart representation of a suitable solvent extraction process, such as hexane solvent extraction, is shown in FIG. 1. In a typical dry-grind process for ethanol production from corn, the DDGS are a by-product or co-product derived from the corn mash after the starch has been converted to ethanol and the ethanol has been removed by distillation. The stillage is typically subjected to centrifugation, evaporation and drying to remove residual liquid content, resulting in DDGS. Methods of extracting crude corn oil from corn DDGS are discussed in Sing et. al., "Extraction of Oil From Corn Distillers Dried Grains with Solubles", Transactions of the ASAE 41 (6), 1775-1777 (1998), the teachings of which are incorporated by reference herein. In addition, solvent extraction technologies and equipment are available from, for example, Crown Iron Works Company of Minneapolis, Minn., U.S.A. Moreover, technology directed to removal of the oil from vegetable particles, removal of residual solvent from solvent extracted materials, and recovery of solvents used in solvent extraction processes are described in, for example, U.S. Pat. Nos. 6,996,917, 6,766,595, 6,732,454, and 6,509,051. These patents are assigned to Crown Iron Works Company, and the teachings of each of these patents are incorporated by reference herein. Still further, the solvent extraction technologies relating to DDGS are disclosed in U.S. Pat. Nos. 8,227,015 and 9,113,645, the teachings of each of these patents being incorporated by reference herein.

Referring again to FIG. 1, which illustrates an embodiment of a solvent extraction process that may be applied to DDGS, as a first step, DDGS meal is fed into an extractor. In some aspects, the DDGS meal may optionally be ground before being fed into an extractor to reduce the particle size of the DDGS meal. In some aspects, the DDGS meal is ground such that about 80%, in some aspects about 85%, in some aspects about 90%, in some aspects about 95%, in some aspects about 99%, and in some aspects about 100% of the DDGS meal has a particle size less than about 1 millimeter. In some aspects about 90% of the ground DDGS meal has a particle size less than about 1 millimeter to about 150 microns, in some aspects less than about 840 microns to about 150 microns, in some aspects less than about 710 microns to about 150 microns, in some aspects less than about 595 microns to about 150) microns, and in some other aspects less than about 525 microns to about 150 microns. In other aspects, the DDGS meal is ground such that at least 95% of the DDGS meal has a particle size less than about 1 millimeter to about 150 microns, in some aspects less than about 840microns to about 150 microns, in some aspects less than about 710 microns to about 150 microns, in some aspects less than about 595 microns to about 150 microns, and in some other aspects less than about 525 microns to about 150 microns. In some other aspects, the DDGS meal is ground such that about 99% of the DDGS meal has a particle size less than about 1 millimeter to about 150 microns, in some aspects less than about 840 microns to about 150 microns, in some aspects less than about 710 microns to about 150 microns, in some aspects less than about 595 microns to about 150 microns, and in some other aspects less than about 525 microns to about 150 microns.

In the extractor, the DDGS meal is washed with solvent, and in one embodiment, the DDGS meal is turned at least once in order to ensure that all DDGS particles are contacted as equally as practicable with solvent. After washing, the resulting mixture of oil and solvent, called miscella, is collected for separation of the extracted oil from the solvent. During the extraction process, as the solvent washes over the DDGS flakes, the solvent not only brings oil into solution, but may collect fine, solid DDGS particles. These "fines" are generally undesirable impurities in the miscella, and in one embodiment, the miscella is discharged from the separator through a device that separates or scrubs the fines from the miscella as the miscella is collected for separation of the oil from the solvent.

In some alternative aspects, one or more enzymes may be added to the miscella to reduce the free fatty acid content. In some aspects, the enzyme can be a commercially available enzyme, such as an immobilized lipase.

In order to separate the oil and the solvent contained in the miscella, the miscella may be subjected to a distillation step. In this step, the miscella can, for example, be processed through an evaporator, which heats the miscella to a temperature that is high enough to cause vaporization of the solvent, but is not sufficiently high to adversely affect or vaporize the extracted oil. The oil may be further stripped of solvent in an oil stripper to further reduce residual solvent levels. As the solvent evaporates, it may be collected, for example, in a condenser, and recycled for future use. Separation of the solvent from the miscella results in a stock of renewable crude oil, which may be further processed to provide, for example, food grade oil for ultimately consumer uses or an oil product suitable for use in a renewable diesel process by hydro-treating the oil to produce green renewable diesel or a transesterification process that yields fatty acid methyl esters for use in biodiesel and/or for ultimate use in the production of oleochemicals, as well as glycerin which may be produced as a consequent of processing the oil. The renewable crude oil may also undergo other processes prior to being produced into renewable diesel, biodiesel, glycerin and/or oleochemicals.

After extraction of the oil, the wet, de-oiled DDGS may be conveyed out of the extractor and subjected to a drying process that removes residual solvent. Removal of residual solvent is important to production of distillers meal suitable for use as an animal feed ingredient. In one embodiment, the wet meal can be conveyed in a vapor tight environment to preserve and collect solvent that transiently evaporates from the wet meal as it is conveyed into the desolventizer. As the meal enters the desolventizer, it may be heated to vaporize and remove the residual solvent. In order to heat the meal, the desolventizer may include a mechanism for distributing the meal over one or more trays, and the meal may be heated directly, such as through direct contact with heated air or steam, or indirectly, such as by heating the tray carrying the meal, or both. The desolventizer may further include multiple different trays for carrying the meal through different processing steps within the desolventizer. In order to facilitate transfer of the meal from one tray to another, the trays carrying the meal may include openings between trays that allow the meal to pass from one tray to the next.

Where the desolventizer utilizes multiple process steps to remove residual solvent from the wet, de-oiled DDGS to produce distillers meal, the wet, de-oiled DDGS may be loaded and transferred through various trays to facilitate heating and solvent removal in multiple process steps. For example, in one embodiment, as the meal enters the desolventizer, it may be loaded on a first group of heated trays where the meal is evenly distributed and solvent vapor is flashed from the meal. From this first set of trays, the meal may be transferred onto a second group of trays, where it is again evenly distributed. The second set of trays may be heated indirectly by steam. The trays may be designed to allow venting of the solvent from one tray to the next and the meal contained in the second set of trays travels counter current to the solvent vapors. A third tray or set of trays may be provided to allow direct steam injection into the meal, which works to strip remaining solvent. Where the desolventizer includes multiple trays and utilizes multiple desolventizing processes, the quantity of trays and their positions may be designed to allow maximum contact between vapors and meal.

From the desolventizer, the meal may be conveyed to a dryer where the meal is dried of residual excess water and cooled to provide a finished distillers meal. As it is conveyed into the dryer, the meal may be deposited into drying trays and it is warmed by heated air. As the meal is heated, residual water is vaporized. After drying, the meal may be cooled using ambient air. The desolventized, dried and cooled distillers meal may be stored, further processed, such as pelletizing to increase densification, or prepared for sale or distribution.

In some aspects, at least about 80%, in some aspects about 85%, in some aspects about 90%, in some aspects about 95%, in some aspects about 99%, and in some aspects about 100% of the distillers meal has a particle size less than about 1 millimeter. In some aspects about 90% of the distillers meal has a particle size less than about 1 millimeter to about 150 microns, in some aspects less than about 840 microns to about 150 microns, in some aspects less than about 710 microns to about 150 microns, in some aspects less than about 595 microns to about 150 microns, and in some other aspects less than about 525 microns to about 150 microns. In other aspects, about 95% of the distillers meal has a particle size less than about 1 millimeter to about 150 microns, in some aspects less than about 840 microns to about 150 microns, in some aspects less than about 710 microns to about 150 microns, in some aspects less than about 595 microns to about 150 microns, and in some other aspects less than about 525 microns to about 150 microns. In some other aspects, about 99% of the distillers meal has a particle size less than about 1 millimeter to about 150 microns, in some aspects less than about 840 microns to about 150 microns, in some aspects less than about 710 microns to about 150 microns, in some aspects less than about 595 microns to about 150 microns, and in some other aspects less than about 525 microns to about 150 microns.

In some aspects, the distillers meal has an average particle size of about 105 microns to about 625 microns, in some aspects about 150 microns to about 600 microns, in some aspects about 175 microns to about 575 microns, in some aspects about 200 microns to about 525 microns, and in some aspects about 250 microns to about 500 microns.

In some aspects, the distillers meal may comprise a residual level of solvent utilized in the solvent extraction process in an amount less than about 2000 ppm, less than about 1500 ppm, less than about 1000 ppm, less than about 500 ppm, less than about 250 ppm, less than about 200 ppm, less than about 150 ppm, less than about 125 ppm, less than about 100 ppm, less than about 75 ppm, and in some aspects less than about 50 ppm.

In some aspects, the distillers meal may comprise a residual level of solvent utilized in the solvent extraction process in an amount of about 10 ppm to about 2000 ppm, in other aspects about 10 ppm to about 1000 ppm, in other aspects about 10 ppm to about 500 ppm, and still in some other aspects about 10 ppm to about 100 ppm.

In some aspects, the distillers meal may comprise a residual level of hexane solvent utilized in the solvent extraction process in an amount less than about 2000 ppm, less than about 1500 ppm, less than about 1000 ppm, less than about 500 ppm, less than about 250 ppm, less than about 200 ppm, less than about 150 ppm, less than about 125 ppm, less than about 100 ppm, less than about 75 ppm, and in some aspects less than about 50 ppm.

In some aspects, a residual level of hexane solvent is present in the distillers meal in an amount of about 10 ppm to about 2000 ppm, in other aspects about 10 ppm to about 1000 ppm, in other aspects about 10 ppm to about 500 ppm, in other aspects about 10 ppm to about 100 ppm, and in still other aspects about 100 ppm to about 500 ppm. In some aspects, a residual level of hexane solvent is present in the corn distillers meal in an amount of about 10 ppm to about 2000 ppm, in other aspects about 10 ppm to about 1000 ppm, in other aspects about 10 ppm to about 500 ppm, in other aspects about 10 ppm to about 100 ppm, and in still other aspects about 100 ppm to about 500 ppm.

In some aspects, the distillers meal may comprise a residual level of 2-methyloxolane solvent utilized in the solvent extraction process in an amount less than about 2000 ppm, less than about 1500 ppm, less than about 1000 ppm, less than about 500 ppm, less than about 250 ppm, less than about 200 ppm, less than about 150 ppm, less than about 125 ppm, less than about 100 ppm, less than about 75 ppm, and in some aspects less than about 50 ppm.

In some aspects, a residual level of hexane solvent and 2-methyloxolane solvent is present in the distillers meal in an amount of about 10 ppm to about 2000 ppm, in other aspects about 10 ppm to about 1000 ppm, in other aspects about 10 ppm to about 500 ppm, in other aspects about 10 ppm to about 100 ppm, and in still other aspects about 100 ppm to about 500 ppm.

In some aspects, the distillers meal may comprise a total residual level of hexane solvent and 2-methyloxolane solvent utilized in the solvent extraction process in an amount less than about 2000 ppm, less than about 1500 ppm, less than about 1000 ppm, less than about 500 ppm, less than about 250 ppm, less than about 200 ppm, less than about 150 ppm, less than about 125 ppm, less than about 100 ppm, less than about 75 ppm, and in some aspects less than about 50 ppm.

In some aspects, a total residual level of hexane solvent and 2-methyloxolane solvent is present in the corn distillers meal in an amount of about 10 ppm to about 2000 ppm, in other aspects about 10 ppm to about 1000 ppm, in other aspects about 10 ppm to about 500 ppm, in other aspects about 10 ppm to about 100 ppm, and in still other aspects about 100 ppm to about 500 ppm.

In some aspects, the distillers meal may comprise a residual moisture content of about 3% to about 15%, in some aspects about 4% to about 13%, and still in other aspects about 7% to about 11%.

The biorefining and solvent extraction processes may be tailored to provide extracted oil exhibiting specific qualities. For example, where the DDGS are corn DDGS and the solvent extraction process is a hexane extraction process, the biorefining and solvent extraction process may be controlled to provide an extracted crude corn oil exhibiting no more than about 15% by weight free fatty acids, such as oleic acid, no more than about 1% by weight crude protein, about 0.5% by weight total nitrogen, 0.2% by weight ash, about 0.05% phosphorus, about 0.01% by weight potassium, about 0.005% sodium, or about 0.05% by weight sulfur, or any combination of one or more such qualities. In one such embodiment, the crude corn oil includes no more than about 0.6%, 0.7%, 0.8% or 0.9% by weight crude protein. In another such embodiment, the crude corn oil contains no more than about 10%, 11%, 12%, 13%, 14%, or 15% by weight free fatty acids. In another such embodiment, the crude corn oil contains free fatty acids in an amount between about 1% to about 15%, in some aspects between about 1% and about 14%, in some aspects between about 1% and about 13%, in some aspects between about 1% and about 12%, in some aspects between about 1% and about 11%, in some aspects between about 1% and about 10%, in some aspects between about 1% and about 9%, in some aspects about 1% and about 8%, in some aspects about 3% to about 15%, by weight of the crude corn oil, with other ranges and subranges of the foregoing ranges contemplated. In another such embodiment, the crude corn oil contains no more than about 0.09%, 0.1%, 0.2%, 0.25%, 0.3%, or 0.4% by weight total nitrogen. In yet another such embodiment, the crude corn oil contains no more than about 0.08%, 0.09%, 0.1%, or 0.15% by weight ash. In another such embodiment, the crude corn oil contains no more than about 0.02%, 0.03%, or 0.04% by weight phosphorus. In yet another such embodiment, the crude corn oil contains no more than about 0.02%, 0.03%, or 0.04% by weight potassium. In yet another such embodiment, the crude corn oil contains no more than about 0.003% or 0.004% by weight sodium. In yet another such embodiment, the crude corn oil contains no more than about 0.02%, 0.03%, or 0.04% by weight sulfur.

It is contemplated that where the DDGS is corn DDGS and the solvent extraction process utilizes other solvents or mixtures of solvents containing alkanes, the biorefining and solvent extraction process may be controlled to provide an extracted crude oil exhibiting no more than about 15% by weight free fatty acids, such as oleic acid, no more than about 1% by weight crude protein, 0.5% by weight total nitrogen, 0.2% by weight ash, 0.05% phosphorus, 0.01% by weight potassium, 0.005% sodium, or 0.05% by weight sulfur, or any combination of one or more such qualities. In one such embodiment, the crude corn oil includes no more than about 0.6%, 0.7%, 0.8% or 0.9% by weight crude protein. In another such embodiment, the crude oil contains no more than about 10%, 11%, 12%, 13%, 14%, or 15% by weight free fatty acids. In another such embodiment, the crude corn oil contains free fatty acids in an amount between about 1% to about 15%, in some aspects between about 1% and about 14%, in some aspects between about 1% and about 13%, in some aspects between about 1% and about 12%, in some aspects between about 1% and about 11%, in some aspects between about 1% and about 10%, in some aspects between about 1% and about 9%, in some aspects about 1% and about 8%, in some aspects about 3% to about 15%, by weight of the crude corn oil, with other ranges and subranges of the foregoing ranges contemplated. In another such embodiment, the crude corn oil contains no more than about 0.09%, 0.1%, 0.2%, 0.25%, 0.3%, or 0.4% by weight total nitrogen. In yet another such embodiment, the crude corn oil contains no more than about 0.08%, 0.09%, 0.1%, or 0.15% by weight ash. In another such embodiment, the crude corn oil contains no more than about 0.02%, 0.03%, or 0.04% by weight phosphorus. In yet another such embodiment, the crude corn oil contains no more than about 0.01%, 0.02%, 0.03%, or 0.04% by weight potassium. In yet another such embodiment, the crude corn oil contains no more than about 0.003% or 0.004% by weight sodium. In yet another such embodiment, the crude corn oil contains no more than about 0.02%, 0.03%, or 0.04% by weight sulfur.

In some aspects, the crude oil extracted utilizing a solvent extraction process on DDGS comprises a residual level of solvent utilized in the solvent extraction process in an amount of about 1 ppm to about 500 ppm, in other aspects about 10 ppm to about 400 ppm, in other aspects about 1 ppm to about 100 ppm, and still in some other aspects about 10 ppm to about 100 ppm. In some aspects, a residual level of solvent is present in the crude corn oil extracted from corn DDGS, the residual level of hexane present in the crude oil present in an amount of about 1 ppm to about 500 ppm, in other aspects about 10 ppm to about 400 ppm, in other aspects about 1 ppm to about 100 ppm, and still in some other aspects about 10 ppm to about 100 ppm. In some aspects, a residual level of hexane solvent is present in the crude oil extracted from DDGS, the residual level of hexane present in the crude oil present in an amount of about 1 ppm to about 500 ppm, in other aspects about 10 ppm to about 400 ppm, in other aspects about 1 ppm to about 100 ppm, and still in some other aspects about 10 ppm to about 100 ppm. In some aspects, a residual level of hexane solvent is present in the crude corn oil extracted from corn DDGS, the residual level of hexane present in the crude oil present in an amount of about 1 ppm to about 500 ppm, in other aspects about 10 ppm to about 400 ppm, in other aspects about 1 ppm to about 100 ppm, and still in some other aspects about 10 ppm to about 100 ppm. In some aspects, a residual level of 2-methyloxolane solvent is present in the crude oil extracted from DDGS, the residual level of 2-methyloxolane present in the crude oil present in an amount of about 1 ppm to about 500 ppm, in other aspects about 10 ppm to about 400 ppm, in other aspects about 1 ppm to about 100 ppm, and still in some other aspects about 10 ppm to about 100 ppm. In some aspects, a residual level of 2-methyloxolane solvent is present in the crude corn oil extracted from corn DDGS, the residual level of 2-methyloxolane present in the crude oil present in an amount of about 1 ppm to about 500 ppm, in other aspects about 10 ppm to about 400 ppm, in other aspects about 1 ppm to about 100 ppm, and still in some other aspects about 10 ppm to about 100 ppm.

In comparing the contents of corn stillage oil (CSO), which is corn oil extracted from the stillage of an ethanol process, to that of crude corn oil extracted utilizing a solvent extraction process on corn DDGS, the content of phosphorous and phosphorous containing compounds in CSO is more than about 100 ppm, and in some instances more than about 105 ppm, which is higher than solvent extracted crude corn oil, which in some aspects can have phosphorous and phosphorous containing compounds in an amount of about 1 ppm to about 50 ppm. Without wishing to be bound by theory, while corn contains some native phosphorus content, which is primarily in the form of phospholipids or phosphatides, the majority of phosphorous is contributed by chemical addition during the ethanol process. The chemical forms of phosphorous, including phosphates, have a relatively high degree of solubility in water. Thus, in the process of recovering CSO, it is expected the various phosphorous forms would be partially washed out with the CSO, and some residual phosphorous content would remain in the CSO. Conversely, these same water soluble phosphorous compounds are not easily extracted with non-polar solvents, such as hexane. Consequently, crude corn oil extracted by a solvent extraction process from corn DDGS contain initial levels of phosphorous and phosphorous containing compounds in an amount of about 1 ppm to about 50 ppm, in some other aspects about 1 ppm to about 20 ppm, in some other aspects about 1 ppm to about 10 ppm, and in still other aspects about 1 ppm to about 5 ppm.

In comparing the contents of CSO to that of crude corn oil extracted utilizing a solvent extraction process on corn DDGS, the content of sulfur and sulfur containing compounds in CSO is more than about 30 ppm, and in some instances about 34 ppm, which is higher than solvent extracted crude corn oil, which in some aspects can have sulfur and sulfur containing compounds in an amount of about 1 ppm to about 20 ppm. While corn contains some native sulfur content, primarily bound in the form of amino acids such as methionine, the majority of sulfur is contributed by chemical addition during the ethanol process. Both the amino acid form and the chemical forms, such as sulfates and sulfites, have a relatively high degree of solubility in water. Thus, in the process of recovering CSO, it is expected the various sulfur forms would be partially washed out with the CSO, and some residual sulfur content would remain in the CSO. Conversely these same water soluble sulfur compounds would not be easily extracted with non-polar solvents, such as hexane. Consequently, crude corn oil extracted by a solvent extraction process from corn DDG contain initial levels of sulfur and sulfur containing compounds in an amount of about 1 ppm to about 20 ppm, in some aspects less than about 15 ppm, in some aspects less than about 12 ppm, in some other aspects about 1 ppm to about 10 ppm, and in still other aspects about 1 ppm to about 5 ppm.

The CSO recovery process in ethanol plants relies on the concept of using an emulsifier to emulsify some of the free oil in water in order to help wash out additional oil from the stillage. An emulsion breaker such as flocculent may be used to separate the lipid and aqueous components into distinct phases in order to fully recover the CSO. Crude oil solvent extracted from DDGS, including crude corn oil solvent extracted from corn DDGS, have reduced contents of non-native emulsifiers and also flocculants (i.e., those used in the Nalco process). In some aspects, the crude oil solvent extracted from DDGS, including crude corn oil solvent extracted from corn DDGS, are substantially free of non-native emulsifiers and also flocculants. Crude oil solvent extracted from DDGS, including crude corn oil solvent extracted from corn DDGS, may also have a reduced content of acids and/or reaction products resulting from the classic method of decreasing pH to break an emulsion. In some aspects, crude oil solvent extracted from DDGS, including crude corn oil solvent extracted from corn DDGS, is substantially free of acids and/or reaction products resulting from the classic method of decreasing pH to break an emulsion. In some aspects, the distillers meal of the present invention has a reduced residual content of any chemicals used for enhanced recovery of oil from stillage including one or more emulsifiers and/or flocculants, which are soluble in solvent and/or oil. In some aspects, a non-polar solvent extraction reduces residual levels of such chemicals to levels of about 50% less than DDGS, in some aspects about 75% less, and in some aspects about 90% less, than DDGS that has not been solvent extracted but has been subjected to CSO recovery using such chemicals. During the CSO recovery process, an emulsifier may be used to help enhance the removal of oil from spent grains, and a flocculent may be used to further help recover oil from thin stillage after mechanical separation.

Crude oil that is solvent extracted from DDGS, including crude corn oil that is solvent extracted from corn DDGS, may also be substantially free of non-native emulsifiers and also flocculants (i.e., Nalco process). Crude oil solvent extracted from DDGS, including crude corn oil solvent extracted from corn DDGS, are also substantially free of acids and/or reaction products resulting from the classic method of decreasing pH to break an emulsion. In comparison, the CSO recovery process in ethanol plants relies on the concept of using an emulsifier to emulsify some of the free oil in water in order to help wash out additional oil from the stillage.

Crude corn oil that is solvent extracted from DDGS that is the result of high-oil content corn may contain one or more signature protein traits that are not available in standard #2 yellow dent corn.

Processing of Renewable Oil Sources-Transesterification to Biofuels and/or Glycerin According to certain aspects, crude oil from renewable oil sources may be used to produce other oleochemicals, particularly oleochemicals for the production of renewable fuels and/or biofuels. In some aspects, the crude oil from one or more renewable oil sources, such as crude oil extracted from DDGS, may be used to produce various oleochemicals after the crude oil undergoes a splitting (or hydrolysis) process of the triglycerides into crude fatty acids and glycerol/glycerin. After the splitting process, additional processing may be utilized, including evaporation, purification and/or bleaching to produce glycerol/glycerin and crude fatty acids. The crude fatty acids and/or glycerin can be subjected to further chemical and enzymatic reactions to produce desired oleochemicals for the production of renewable fuels and/or biofuels.

Figure 2:
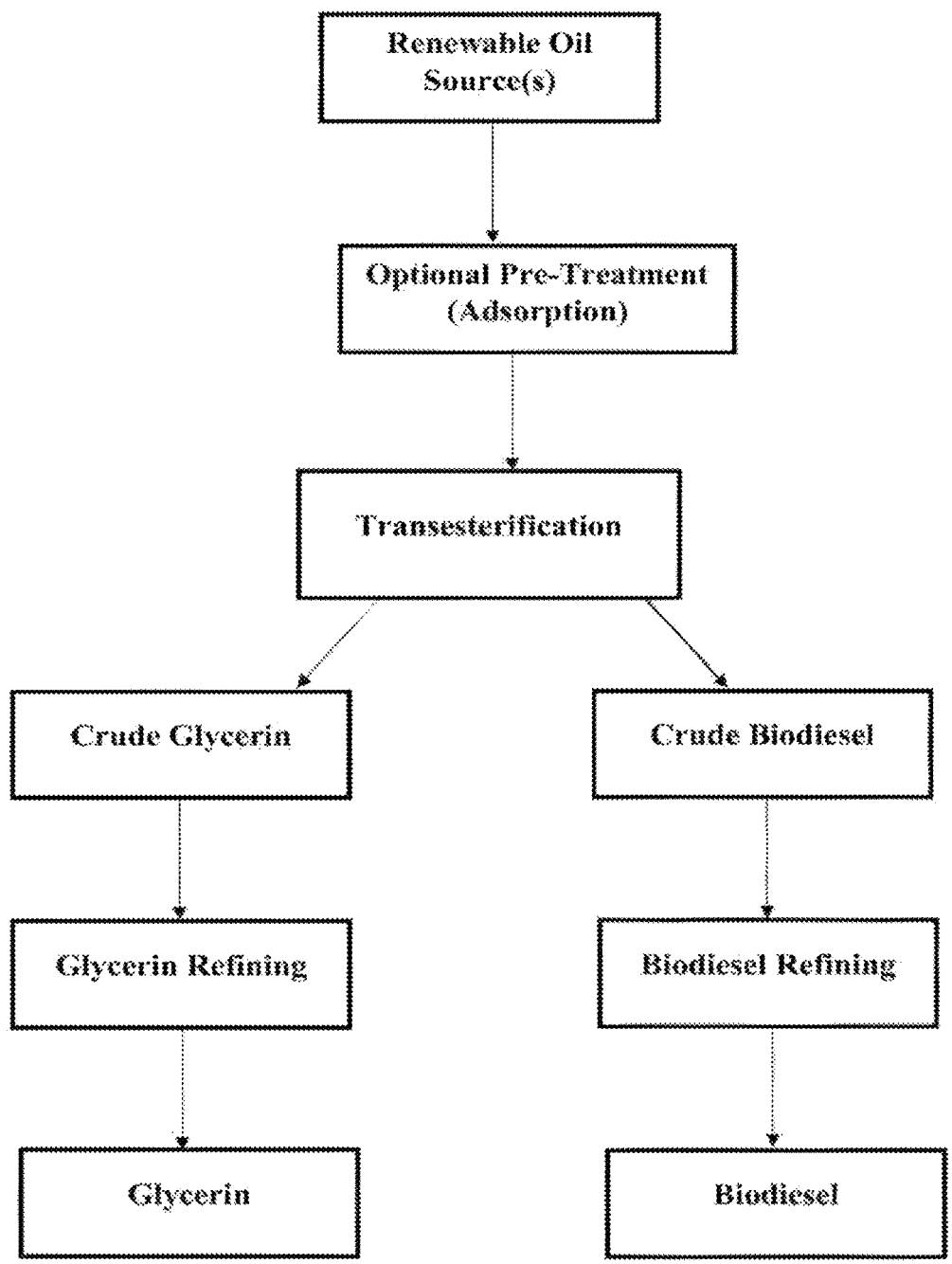
FIG. 2 provides a flow-chart schematic representation of a process by which glycerin and/or biodiesel are produced from one or more natural oil sources, according to certain aspects of the present invention. In some preferred aspects, the one or more natural oil sources comprises crude corn oil produced according to the solvent extraction process of FIG. 1.

Referring now to the flow-chart representation of a process for refining biodiesel and glycerin in FIG. 2, one or more renewable oil sources, such as DCO, CSO or crude oil extracted from DDGS, may be used to produce biodiesel and/or glycerin. There are several processes that may be used to produce biodiesel from oils and fats, including base catalyzed transesterification, direct acid catalyzed transesterification and/or esterification, enzyme catalyzed transesterification and/or esterification, high pressure transesterification (i.e. Henkel process), and/or a combination of same for conversion of the oil to biodiesel. Biodiesel production technologies and equipment are commercially available from, for example, Crown Iron Works Company of Minneapolis, Minn., U.S.A., and from Lurgi AG of Frankfurt, Germany. To produce biodiesel and/or glycerin from one or more renewable oil sources, such as the crude oil extracted from the DDGS, an acid catalyzed esterification or caustic neutralization, followed by a transesterification process may be used.

In one preferred aspect of the refining process outlined in FIG. 2, the renewable oil source is a crude extracted oil, such as crude corn oil that has been solvent extracted from DDGS. Before the crude corn oil is subjected to a transesterification process, it may be pretreated. Pretreatment of the crude corn oil may be carried out, for example, to remove gums included in the oil or to remove or neutralize free fatty acids. As part of a degumming process, an acid, such as phosphoric acid, may be added to the crude corn oil and the crude oil may be heated, for example, using steam. In such a process, the acid and steam work to hydrate the gums so that the gums can be separated from the crude corn oil, such as by centrifugation or another suitable separation technique.

Free fatty acids in the crude corn oil are generally undesirable because they form soaps within the oil as they react with the base catalyst used to drive the transesterification reaction. If the crude corn oil is also pretreated with a degumming step, the addition of the strong base intended to neutralize the free fatty acids may occur after addition of the acid in the degumming step. In this manner, the base added to neutralize the free fatty acids can also work to neutralize the acid used in the degumming step. The soap stock that results from degumming and neutralization of the crude corn oil may be separated from the corn oil using standard equipment, such as a centrifugal separator. Alternatively, the free fatty acids can be removed and acid esterified to form biodiesel, or combined with glycerin to form triglycerides, which are then transesterified to form biodiesel.

Treatment of the crude corn oil may also include one or more bleaching steps, such as one or more heat bleaching or clay bleaching steps to remove residual color or other impurities from the corn oil.

Where pretreatment of the crude corn oil includes degumming and neutralization of free fatty acids, prior to a transesterification process, the degummed and neutralized oil is typically washed prior to transesterification. Washing may include, for example, mixing the pretreated corn oil with warm wash water. After washing, the oil and wash water are separated, and the pretreated corn oil is dried, such as by a vacuum-dryer, to a desired water content.

In one embodiment, the pretreated corn oil can be subjected to a transesterification reaction to provide biodiesel and/or glycerin. The transesterification reaction is based on the chemical reaction of triglycerides contained in the crude corn oil with an alcohol in the presence of an alkaline catalyst. The alkaline catalyst used in the transesterification reaction may be selected from several different alkaline materials. Suitable catalysts are strong bases and include, for example, NaOH (caustic soda), KOH (potash), and CH3NaO (sodium methylate). The alcohol used in the transesterification reaction may be selected from, for example, methanol or ethanol.

As the transesterification reaction is carried out, the alcohol and catalyst may be delivered into the corn oil in parallel, as separate reaction components, or the alcohol and catalyst can be delivered to the crude corn oil as a mixture. When delivered as a mixture, the catalyst may be dissolved in the alcohol by any suitable means prior to charging the mixture into the corn oil. Alternatively, the catalyst may be provided as a liquid and mixed with the alcohol, limiting the need for dissolution of the catalyst in the alcohol prior to mixing the alcohol and catalyst with the corn oil. Where the catalyst is mixed with the alcohol as a liquid, the catalyst may be added to the alcohol by, for example, one or more metering pumps. In addition, because an alkaline catalyst might be sensitive to water, the catalyst may be stored in a pump tank protected with a nitrogen layer.

In carrying out the transesterification reaction, the alcohol, catalyst and corn oil may be charged into a closed reaction vessel. The reaction system can be closed to the atmosphere to prevent loss of the alcohol used in the transesterification reaction. As the reaction components are mixed, the mixture may be kept just below the boiling point of the alcohol to speed the reaction time. In addition, an excess amount of alcohol is typically used to ensure total conversion of the corn oil triglycerides into the desired ester product. The transesterification reaction produces a two-phase reaction product that includes an ester-rich phase (crude biodiesel) and a glycerin-rich phase (crude glycerin). The crude glycerin is much more dense than the crude biodiesel and the two phases can be easily separated by gravity separation or, if needed or desired, centrifugation.

In one embodiment, transesterification of the corn oil takes place in one or more mixer-settler units. In such units, the transesterification reaction occurs in a mixer or reactor included in the mixer-settler units. The crude biodiesel and crude glycerin resulting from the transesterification reaction form two distinct phases that can be separated in the settlers. If two or more mixer-settler units are used as the reaction vessels, the feedstock and the intermediate product, respectively, may flow successively through the two or more mixer-settler units. Each mixer-settler unit can be supplied with the desired alcohol and catalyst in parallel. The reactors included in the mixer-settler units can be multi-stage in design, comprising various reaction chambers in order to achieve maximum conversion efficiency to the ester product. The settlers allow phase separation to approach the limit of solubility, which eases downstream purification of the biodiesel and glycerin products.

At the transesterification stage, vapors vented from the reaction vessel, such as the one or more mixer-settlers, may be routed to a condenser where they are partly or completely condensed and returned to the reaction process. The same may be done with the vessel used to store or deliver the alcohol used in the transesterification reaction. Even further, where the catalyst is provided in liquid form, it too may be stored and delivered from a storage vessel, and any vapors vented from the catalyst storage vessel may also be captured, partly or completely condensed, and returned to the reaction process in liquid form.

Once the transesterification reaction is complete, two major products exist: glycerin and biodiesel. The glycerin is included in the crude glycerin phase and the biodiesel is incorporated in the crude biodiesel phase. Each of these crude phases may include a substantial excess of the alcohol used in the reaction. Moreover, the crude reaction products may include other impurities such as excess catalyst, soaps and high boiling impurities. If desired, some of these impurities may be treated or removed from the crude reaction products before the crude biodiesel and the crude glycerin phases are separated. For example, a suitable acid may be added to and mixed with the reaction products to neutralize excess catalyst and further help break any emulsions. Additionally, excess alcohol may be removed from the crude reaction products using standard distillation equipment and techniques.

After the crude biodiesel and crude glycerin are separated, they are typically subjected to further refining. For example, after separation, the crude biodiesel may contain residual alcohol, glycerin, small amounts of catalyst, and soaps. This may be the case even if the crude reaction products are refined to remove or neutralize impurities prior to separation. If they have not already been refined to neutralize excess catalyst or remove excess alcohol, or if residual catalyst and excess alcohol still remain in the separated reaction products, the crude biodiesel and crude glycerin may be treated with a suitable acid to neutralize the residual catalyst and subjected to, for example, a flash evaporation process or distillation to remove the excess alcohol.

Even where steps are taken to neutralize residual catalyst and remove excess alcohol, the refined biodiesel may still include water soluble impurities. In order to remove such water-soluble substances, the refined biodiesel may be washed and dried. To avoid the formation of emulsions during washing, the biodiesel may be pH adjusted, for example, by the addition of an acid to the biodiesel to be washed. Dilute HCl, such as a 3.7% strength HCl, is suitable for such an application and can be prepared and added as necessary. The biodiesel wash process may simply include gentle mixing of the biodiesel with warm water, which will work to remove residual, water soluble impurities as they are taken up in the aqueous phase.

If the biodiesel is processed through such a washing step, the refined and washed biodiesel may contain excess water. Such excess water may be removed, for example, by subjecting the biodiesel to a drying step. The drying step may include, for example, vacuum drying the biodiesel to a desired water content in a dryer circuit. The dried biodiesel, which is ready for use, distribution or sale, is collected and stored. Though the biodiesel is serviceable at this point, if desired, it can be subjected to further distillation to remove any color bodies and other higher molecular weight impurities remaining to provide a colorless biodiesel.

The separated, crude glycerin phase may also be further refined after separation. In particular, the crude glycerin may be neutralized with a suitable acid, the excess alcohol may be removed by distillation or flash evaporation, and the crude glycerin may be dried to remove residual water. Even if the crude reaction products of the transesterification process are neutralized and the excess alcohol present in the crude reaction products is removed prior to separation, the separated, crude glycerin may still contain residual catalyst or alcohol. Where that is the case, the separated, crude glycerin may be subjected to additional neutralization, absorptive filtration, and/or distillation steps to neutralize any residual catalyst and remove any remaining alcohol. Once such neutralization, distillation and drying steps are complete, the crude product typically contains approximately 80-88% pure glycerin. This crude glycerin can be further refined to a purity of 99% or higher, as is known in the art, such that the glycerin product is suitable for use in cosmetic or pharmaceutical applications. In some preferred aspects, as described in more detail herein, the glycerin can be used in a glycerolysis reaction to reduce the FFA content of a feedstock.

In order to minimize loss of the alcohol used in the transesterification reaction, all vessels which contain alcohol, whether in substantially pure form or as part of a crude reaction product, may be connected to a vent system to capture any alcohol vapors. Captured alcohol vapors may be fed into a condensing system that recovers the alcohol and recycles the alcohol back into the refining process.

In some aspects, the transesterification reaction is a batch process. In some other aspects, the transesterification reaction is a continuous process.

While the foregoing transesterification reaction has been discussed in relation to the renewable oil sources being DCO, CSO or crude oil extracted from DDGS to produce biodiesel and/or glycerin, the renewable oil source may be any other crude oil from one or more renewable oil sources, preferably one or more plant-based oils.

Reduction of FFA Content by Glycerolysis for Renewable Fuel Production

In some aspects, a renewable oil source may be a feedstock for production of biodiesel and/or renewable fuels. However, in some aspects, the renewable oil source may contain an undesirable level of free fatty acids, which may poison and thereby reduce the lifetime of catalysts for the production of biodiesel and/or renewable fuels, such as renewable diesel, or cause equipment problems due to the corrosive nature of free fatty acids, especially at higher weight-%, time and temperature during processing.

Figure 3:
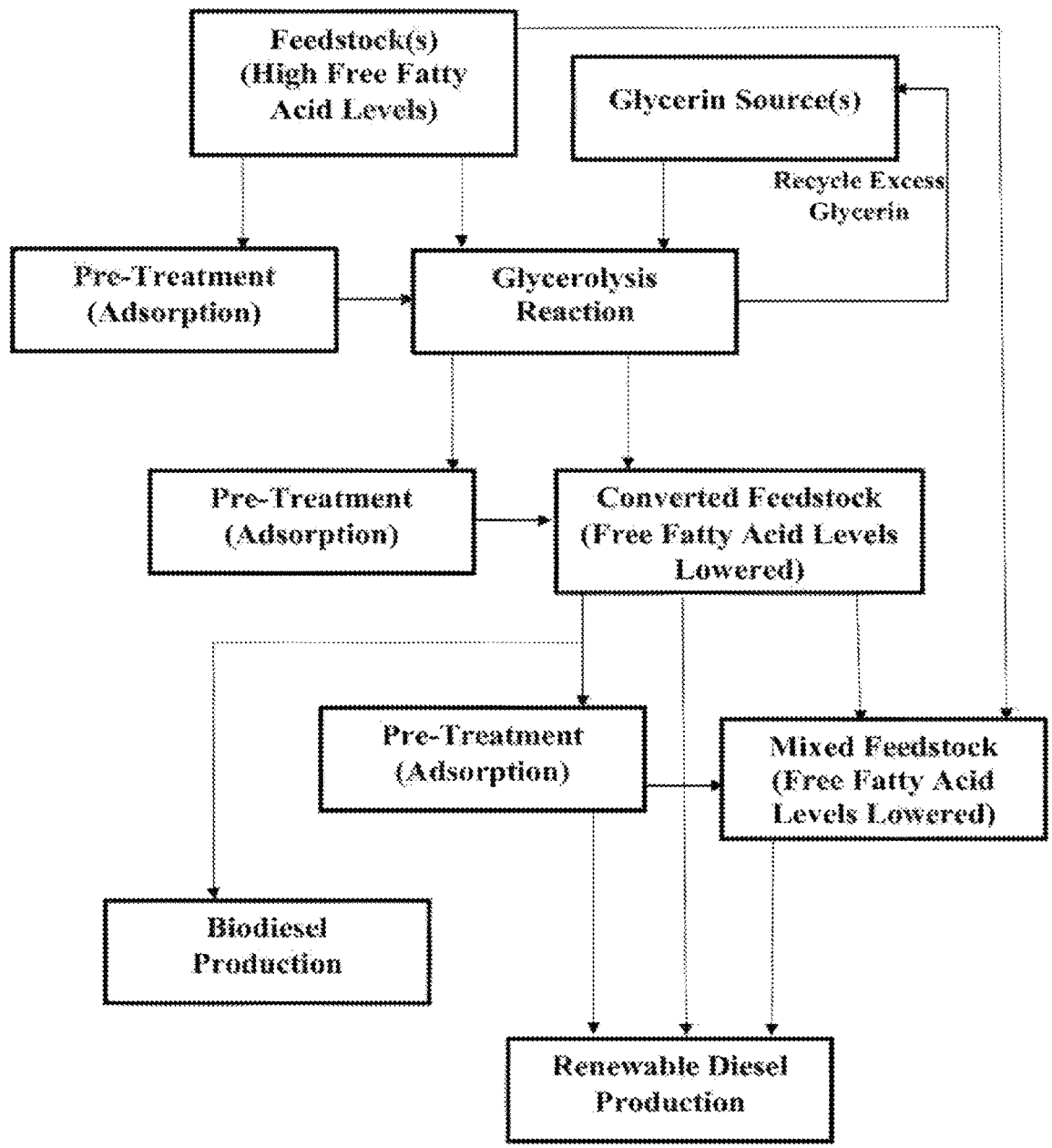
FIG. 3 provides a flow-chart schematic representation of a reduction of FFAs from a feedstock by a glycerolysis process in the presence of a molar excess of glycerin to provide a feedstock mixture having a reduced FFA level compared to the feedstock FFA level, according to certain aspects of the present invention. In some preferred aspects, the feedstock comprises crude corn oil produced according to the solvent extraction process of FIG. 1 and/or the glycerin source is provided according to the process of FIG. 2.

According to certain aspects of the present disclosure, conducting a glycerolysis process on the renewable oil source having a high level of free fatty acids will provide commercially significant amounts of a feedstock having a lowered free fatty acid level that is acceptable for biodiesel production and/or renewable diesel production, as illustrated in FIG. 3.

In some preferred aspects, the renewable oil source is one or more plant-based oils. Plant-based oils may include soy bean oil, palm oil, peanut oil, rice oil, flaxseed oil, sesame oil, grape seed oil, sunflower oil, rapeseed oil, olive oil, canola oil, coconut oil, almond oil, avocado seed oil, cottonseed oil, hemp oil, pumpkin seed oil, safflower seed oil, castor oil, nut oil and the like. In some preferred aspects, the plant-based oil comprises corn oil, which can be preferably produced from a dry solvent extraction process as discussed above in relation to FIG. 1. In some preferred aspects, the plant-based oil is corn oil produced from an ethanol production process, such as CSO, DCO, crude oil extracted from DDGS, such as solvent extracted crude corn oil from DDGS, or a mixture thereof. In some aspects, the plant-based oil is produced from an ethanol production process that utilizes corn, barley, rye, sorghum, or soy bean grain. In some preferred aspects, the plant-based oil is produced from a solvent extraction process of a by-product of the ethanol production process. In one preferred aspect, the plant-based oil comprises crude corn oil produced from a solvent extraction process from corn DDGS and/or DDG as discussed above in relation to FIG. 1. In some other aspects, the plant-based oil comprises distillers corn oil (DCO). In still other aspects, the plant-based oil can be the result of acidulation of soapstock from vegetable oil refining. In still some other aspects, the renewable oil source comprises a combination of any of the foregoing plant-based oils.

In some other preferred aspects, the renewable crude oil source is one or more animal-based fats or oils, whereby fatty acids can be derived from splitting animal fats or oils. Animal-based fats/oils are primarily extracted from rendered tissue fats from livestock animals, such as pigs, cows and chickens and the like. Accordingly, animal-based fats/oils may include or derived from choice white grease, tallow, suet, lard, schmaltz, poultry oil and the like.

In yet some other preferred aspects, the renewable crude oil source is a mixture of one or more plant-based oils and one or more animal-based fats or oils.

In some preferred aspects, the levels of free fatty acids in the renewable oil source as a feedstock may be reduced to a desirable level by conducting either thermodynamic or enzymatic glycerolysis of the feedstock in the presence of glycerin. Conducting glycerolysis converts triglycerides in the feedstock having a high level of free fatty acids to monoglycerides and/or diglycerides, such that the converted feedstock has a lowered level of free fatty acids.

In some preferred aspects, the glycerolysis is conducted by a thermodynamic reaction at temperatures between about 150° C. and about 250° C., and in some aspects between about 175° C. and about 225° C., for a period of time between about 30 minutes and about 180 minutes, and in some aspects between about 60 minutes and about 120 minutes, wherein a glycerin to free fatty acid molar ratio is at least 1.1:1, in some aspects at least 1.25:1, in some aspects at least 1.5:1. In some other preferred aspects, the temperature of the thermodynamic reaction can be adjusted by using high pressures, such as pressures in the range of 100-200 bar, such that one of ordinary skill in the art will appreciate the relationship between the desired temperatures at higher pressures.

In some preferred aspects, the glycerolysis conducted by a thermodynamic reaction is conducted in the absence of a catalyst. In some other preferred aspects, the glycerolysis conducted by the thermodynamic reaction is conducted in the presence of one or more catalysts.

Without wishing to be bound by theory, conducting glycerolysis of a feedstock having a high level of free fatty acids in the presence of a molar excess of glycerin under heat and/or high pressure results in three primary reactions shown in Equations 1-3 below:

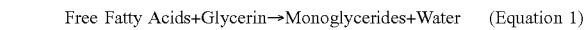
Free Fatty Acids+Glycerin→Monoglycerides+Water  (Equation 1)

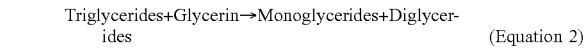
Triglycerides+Glycerin→Monoglycerides+Diglycerides  (Equation 2)

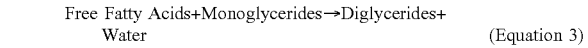
Free Fatty Acids+Monoglycerides→Diglycerides+Water  (Equation 3)

In some preferred aspects, the glycerolysis is conducted by an enzymatic reaction, wherein the solvent to fat ratio is about 2:1 (v/w), the glycerin to fat ratio is at least 1.5:1, and the enzyme concentration is greater than about 10% (w/w). In some aspects, the enzyme can be a commercially available enzyme, which is an immobilized lipase.

In some preferred aspects, the glycerolysis reaction is not completed to eliminate the free fatty acid content of the renewable source feedstock, but instead reduces the levels of free fatty acids in the renewable source feedstock to an acceptable level, such that there is a residual level of free fatty acids remaining.

In some other aspects, glycerolysis reaction is conducted until completion to eliminate the free fatty acid content of the renewable source feedstock, such there is essentially no residual level of free fatty acids remaining.

In some preferred aspects, the levels of free fatty acids in the renewable source feedstock prior to glycerolysis is greater than 1%, in some aspects greater than about 2%, in some aspects greater than about 3%, in some aspects greater than about 4%, in some aspects greater than about 5%, in some aspects greater than about 6%, in some aspects greater than about 7%, in some aspects greater than about 8%, in some aspects greater than about 9%, in some aspects greater than about 10%, in some aspects greater than about 11%, in some aspects greater than about 12%, in some aspects greater than about 13%, in some aspects greater than about 14%, and in some other aspects up to about 15%, by mass of total fat. In some preferred aspects, the free fatty acid content of the renewable source feedstock prior to glycerolysis is between about 1% and about 15% by mass of total fat, more preferably between about 5% and about 15% by mass of total fat.

In some preferred aspects, the levels of free fatty acids in the renewable source feedstock is reduced by glycerolysis in an amount of at least 1%, in some aspects in an amount of at least 2%, in some aspects in an amount of at least 3%, in some aspects in an amount of at least 4%, in some aspects in an amount of at least 5%, in some aspects in an amount of at least 6%, in some aspects in an amount of at least 7%, in some aspects in an amount of at least 8%, in some aspects in an amount of at least 9%, in some aspects in an amount of at least 10%, in some aspects in an amount of at least 11%, in some aspects in an amount of at least 12%, in some aspects in an amount of at least 13%, and in some aspects in an amount of at least 14%, by mass of total fat.

In some preferred aspects, the free fatty acid content of the renewable source feedstock is reduced by glycerolysis by an amount between about 1% and about 14%, in some aspects between about 2% and about 13%, in some aspects between about 3% and about 12%, in some aspects between about 4% and about 11%, and in some aspects between about 5% and about 10%, by mass of total fat.

In some preferred aspects, the free fatty acid content of the renewable source feedstock prior to glycerolysis is greater than 5% and the resultant free fatty acid content of the renewable source feedstock after glycerolysis is less than 5%.

In some preferred aspects, the levels of free fatty acids in the feedstock after glycerolysis is less than about 4%, in some aspects less than about 3%, in some aspects less than about 2%, in some aspects less than about 1%, in some less than about 0.9%, in some aspects less than about 0.8%, in some aspects less than about 0.7%, in some aspects less than about 0.6%, and in some aspects less than about 0.5%, by mass of total fat. In some preferred aspects, the free fatty acid content of the feedstock after glycerolysis is between about 0.1% and less than 4%, in some aspects between about 0.25% and less than 3%, and in some other aspects between about 0.5% and less than 2% by mass of total fat.

In some preferred aspects, the glycerolysis process converts up to 80%, in some aspects up to 85%, in some aspects up to 90%, in some aspects up to 95%, in some aspects up to 98%, and in some other aspects up to 99% of free fatty acids of the feedstock to monoglycerides, diglycerides, or a combination thereof.

In some preferred aspects, the glycerolysis process converts at least 80%, in some aspects at least 85%, in some aspects at least 90%, in some aspects at least 95%, in some aspects at least 98%, and in some other aspects at least 99% of free fatty acids of the feedstock to monoglycerides, diglycerides, or a combination thereof.

In some preferred aspects, the glycerolysis process is conducted with a molar excess of glycerin to the free fatty acids in the renewable oil source. In some aspects, the molar excess of glycerin to the free fatty acids is at least 1.1:1, in some aspects at least 1.25:1, in some aspects at least 1.5:1.

In some preferred aspects, the glycerolysis process is conducted under a molar excess of glycerin to the fatty acids in the renewable oil source. In some aspects, the free fatty acid content of the renewable oil source prior to glycerolysis contains between about 75% and about 95% triacylglycerides, between about 5% and about 12% diacylglycerides and less than about 5%, in some aspects less than about 4%, in some aspects less than about 3%, and in some aspects less than about 2% monoacylglycerides, such that the total content of the diacylglycerides and monaclyglycerides in the renewable oil source is less than 15%. In some aspects, at least 80% and up to 99% of the free fatty acid content of the renewable oil source is converted by the glycerolysis process to at least 15% monoglycerides, diglycerides, or a combination thereof. In some aspects, at least 80% and up to 99% of the free fatty acid content of the renewable oil source is converted by the glycerolysis process to at least 15% monoglycerides, diglycerides, or a combination thereof.

In some aspects, glycerolysis is conducted on the free fatty acid content of the renewable oil source in the presence of a source of glycerin to provide a feedstock having a reduced triacylglycerides portion, wherein at least 80% of the free fatty acid content of the renewable oil source is converted by glycerolysis to at least 15% monoglycerides, diglycerides, or a combination thereof. In some aspects, at least 80% of the free fatty acid content of the renewable oil source is converted by glycerolysis to at least 16% monoglycerides, diglycerides, or a combination thereof. In some aspects, at least 80% of the free fatty acid content of the renewable oil source is converted by glycerolysis to at least 17% monoglycerides, diglycerides, or a combination thereof. In some aspects, at least 80% of the free fatty acid content of the renewable oil source is converted by glycerolysis to at least 18% monoglycerides, diglycerides, or a combination thereof. In some aspects, at least 80% of the free fatty acid content of the renewable oil source is converted by glycerolysis to at least 19% monoglycerides, diglycerides, or a combination thereof. In some aspects, at least 80% of the free fatty acid content of the renewable oil source is converted by glycerolysis to at least 20% monoglycerides, diglycerides, or a combination thereof.

Any excess glycerin not utilized during the glycerolysis reaction can be recycled. In some aspects, the excess glycerin is recycled back to the glycerin source.

Sources of glycerin may be plant-based or animal-based, preferably such that the glycerin source is renewable. In some aspects, the glycerin source is a byproduct of biodiesel production, such as the transesterification of a renewable oil source. In some aspects, the plant-based glycerin may be from processing corn oil, while in some other aspects from processing palm oil. The source of glycerin may also be animal-based from processing animals. In some aspects, the glycerin source is provided from splitting or transesterification of fats or oils. In some other preferably aspects, the glycerin source can be crude glycerin, or alternatively refined glycerin.

A pre-treatment step may be conducted on the feedstock prior to conducting glycerolysis. A pre-treatment step may be conducted on the converted feedstock after glycerolysis prior to a renewable diesel process. Alternatively, a pre-treatment step may be conducted prior to and also after conducting glycerolysis. The pre-treatment step could be conducted to reduce metals, other ions, or other byproducts of the solvent extraction and/or glycerolysis processes. In some aspects, the pre-treatment step could comprise drying, filtration and/or treatment with one or more organic acids along with adsorption on bleaching earth or other structured media, such as silica gel. In some aspects, drying is carried out using temperature and vacuum.

The converted feedstock can then be used for biodiesel production and/or renewable fuel production. In some aspects, the converted feedstock can be mixed with the renewable oil source, such as to provide a mixed feedstock having a desirable free fatty acid content. In some aspects, the mixed feedstock comprises a blend of a first portion of the converted feedstock and a second portion of the renewable oil source, wherein the mixed feedstock has a free fatty acid level that is lower than that of the renewable oil source.

Referring again to FIG. 1, which illustrates an embodiment of a solvent extraction process that may be applied to DDGS, as a first step, DDGS meal is fed into an extractor. In some aspects, the DDGS meal may optionally be ground before being fed into an extractor to reduce the particle size of the DDGS meal. In some aspects, the DDGS meal is ground such that about 80%, in some aspects about 85%, in some aspects about 90%, in some aspects about 95%, in some aspects about 99%, and in some aspects about 100% of the DDGS meal has a particle size less than about 1 millimeter.

The crude oil extracted from DDGS in FIG. 1 may be used as a renewable feedstock to produce green renewable fuels. The converted feedstock and/or mixed feedstock produced as a result of the glycerolysis reaction may also be used as a renewable feedstock to produce green renewable fuels.

Figure 4:
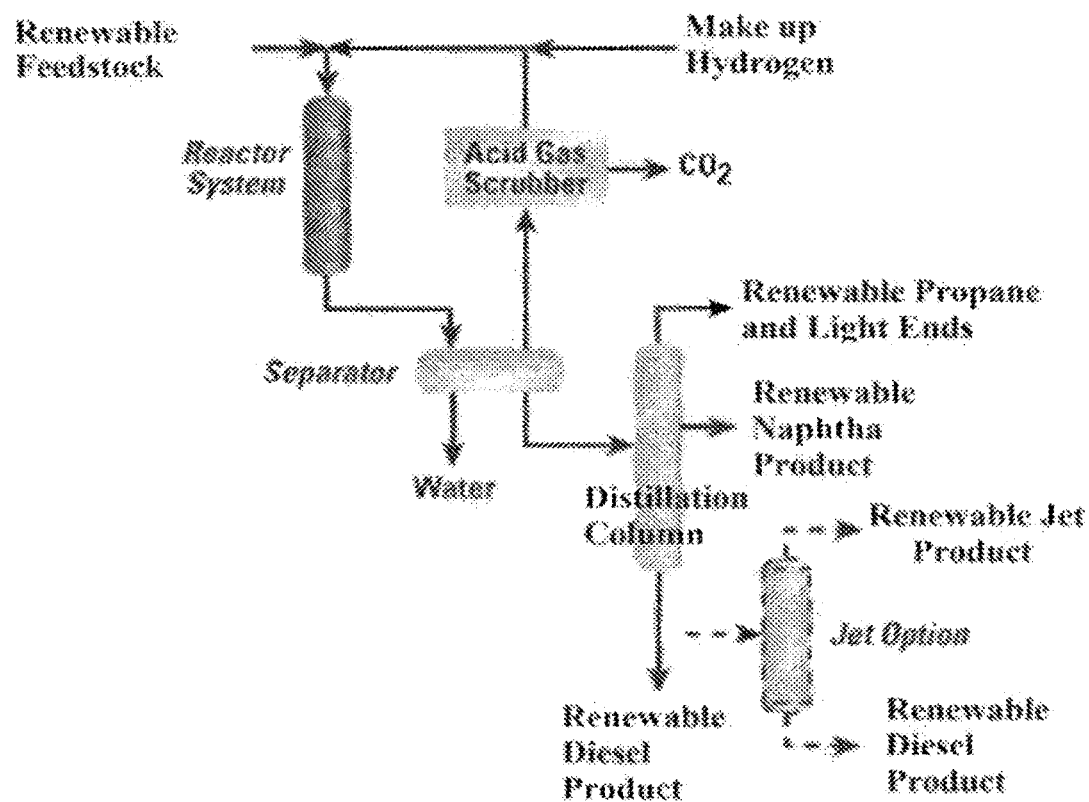
FIG. 4 provides a schematic flow-chart representation of a renewable fuel production process, such as a renewable propane and light ends, a renewable naphtha product, a renewable diesel product and/or a renewable jet product, using a renewable feedstock mixture, according to certain aspects of the present invention.

As illustrated in FIG. 4, the renewable feedstock, whether crude oil extracted from DDGS, the converted feedstock and/or the mixed feedstock, may be subjected to a hydro-treating process, which involves the hydrogenation of the double bonds of the side chains of the triglycerides in the renewable oil feedstock and the removal of oxygen on the metal sites of the catalysts. The hydro-treating of the renewable oil feedstock leads to the production of C14-C20 hydrocarbons, in some aspects C15-C18 straight chain and branched paraffins, which is a liquid mixture with the boiling point range of diesel, such that the renewable diesel can be a fuel replacement for petro-diesel.

Factors affecting hydro-treating process are temperature, hydrogen/oil ratio, pressure, catalyst and space velocity. While the hydro-treatment of vegetable oils is a mature technology, it is not believed that the hydro-treating process has utilized the unique renewable oil feedstocks of the present invention.

In the hydro-treating process, the renewable oil feedstock may be mixed with recycle hydrogen and/or make-up hydrogen before being provided at process pressure in a reactor system comprising one or more catalytic hydrodeoxygenation reactors. In some aspects, the reactor is a multi-stage adiabatic, catalytic hydrodeoxygenation reactor. In the reactor, the renewable oil feedstock is saturated and completely deoxygenated to yield deoxygenated hydrocarbon products. The primary deoxygenation reaction by-products are propane, water and carbon dioxide, which along with other low molecular weight hydrocarbons may be separated from the deoxygenated product. In some aspects, the deoxygenated product is processed in a second reactor packed with a selective hydrocracking catalyst whereby both cracking of larger molecules and hydroisomerization takes place. In some aspects, the deoxygenated product is mixed with additional hydrogen gas for the hydroisomerization process. The excess hydrogen and the isomerized product may be separated in a conventional gas/liquid separator. The resulting product then undergoes separation in a fractional distillation column where the various products are produced, including green renewable propane and light ends, green renewable naphtha product, and green renewable diesel product. The green renewable diesel product may include a green renewable jet product and a green renewable diesel product.

In some aspects, the green renewable diesel product comprises renewable diesel meeting current low-carbon fuel standards. In some aspects, the green renewable diesel product comprises renewable diesel meeting ASTM D975 specification for petroleum diesel in the United States and EN 590 in Europe.

In some aspects, the green renewable jet product comprises renewable jet fuel, otherwise known as sustainable aviation fuel, meeting ASTM D7566 standards. In some aspects, the sustainable aviation fuel can be blended with convention jet fuel meeting ASTM D1655 standards.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Still further, the methods, systems, and compositions disclosed and claimed herein can comprise, consist of, or consist essentially of the essential elements and limitations of the methods, systems and compositions described herein.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112 (f) are not to be invoked unless the specific terms "means for" or "step for" are recited in a claim.

The invention claimed is:

1. A method of producing one or more renewable fuels or one or more biofuels from a renewable oil source, the method comprising:
   providing a renewable oil source, wherein the renewable oil source is a renewable corn oil source provided from solvent extraction of distillers dried grains with solubles (DDGS), distillers dried grains (DDG), or a combination thereof, using at least one renewable solvent comprising 2-methyloxolane;
   conducting glycerolysis on a free fatty acid content of the renewable oil source in the presence of a source of glycerin to provide a feedstock having a reduced free fatty acid content; and
   subjecting the feedstock to a conversion process to produce one or more renewable fuel or one or more biofuels.

2. The method of claim 1, wherein the free fatty acid content of the renewable oil source comprising a triacylglycerides portion in an amount between about 75% and about 95%, a diacylglycerides portion in an amount between about 5% and about 12%, and a monoacylglycerides portion less than about 5%, wherein a total content of the diacylglycerides portion and the monaclyglycerides portion is less than 15%, by mass of total fat.

3. The method of claim 2, wherein the reduced free fatty acid content of the feedstock having a reduced triacylglycerides portion, wherein at least 80% of the free fatty acid content of the renewable oil source is converted by glycerolysis to at least 15% monoglycerides, diglycerides, or a combination thereof, by mass of total fat.

4. The method of claim 1, wherein the free fatty acid content of the renewable oil source is greater than 5%, by mass of total fat.

5. The method of claim 4, wherein a free fatty acid content of the feedstock has been reduced to a content less than 4%, by the glycerolysis process.

6. The method of claim 1, wherein the renewable oil source is provided from a solvent extraction of distillers dried grains with solubles (DDGS), distillers dried grains (DDG), or a combination thereof, the solvent extraction using at least one solvent having a boiling point in the range of about 36° C. to about 99° C.

7. The method of claim 1, wherein the renewable oil source is a renewable corn oil source provided from solvent extraction of distillers dried grains with solubles (DDGS), distillers dried grains (DDG), or a combination thereof, wherein the solvent extraction using at least one non-polar solvent comprising one or more isomers, enantiomers or mixtures of C5-C7-alkanes.

8. The method of claim 1, wherein the solvent extraction using at least one solvent having a boiling point in the range of about 36° C. to about 99° C.

9. The method of claim 1, wherein the glycerolysis process is a batch process or a continuous process.

10. The method of claim 1, wherein the glycerolysis process is conducted in the presence of a molar excess of glycerin to the renewable oil source.

11. The method of claim 1, wherein the glycerolysis process is a thermodynamic reaction conducted at a reaction temperature between about 175° C. and about 225° C., for a period of time between about 60 minutes and about 120 minutes, wherein the glycerolysis reaction has a glycerin to free fatty acid molar ratio of at least 1.1:1.

12. The method of claim 1, wherein the glycerolysis process is an enzymatic reaction.

13. The method of claim 1, wherein the free fatty acids content in the renewable oil source prior to the glycerolysis reaction is between about 5% and about 15%, by mass of total fat.

14. The method of claim 1, wherein the free fatty acids content of the renewable oil source is reduced by the glycerolysis process in an amount between about 1% and about 14%, by mass of total fat.

15. The method of claim 1, wherein the reduced free fatty acids content of the feedstock is between about 0.5% and less than 2% by mass of total fat.

16. The method of claim 1, wherein the renewable oil source undergoes the glycerolysis process in the presence of a molar excess of glycerin to the free fatty acids in the renewable oil source of at least 1.1:1.

* * * * *